United States Patent [19]
Buckley

[11] Patent Number: 5,515,454
[45] Date of Patent: *May 7, 1996

[54] SELF-ORGANIZING CIRCUITS

[76] Inventor: B. Shawn Buckley, 7069 Via Blanca, San Jose, Calif. 95139

[*] Notice: The term of this patent shall not extend beyond the expiration date of Pat. No. 5,162,203

[21] Appl. No.: 922,153

[22] Filed: Jul. 30, 1992

Related U.S. Application Data

[63] Continuation-in-part of Ser. No. 647,645, Jan. 28, 1991, Pat. No. 5,161,203, which is a continuation-in-part of Ser. No. 215,583, Jul. 6, 1988, Pat. No. 4,989,256, which is a continuation-in-part of Ser. No. 202,045, Jun. 3, 1988, abandoned, which is a continuation-in-part of Ser. No. 911,144, Sep. 24, 1986, Pat. No. 4,774,677, which is a continuation-in-part of Ser. No. 290,784, Aug. 6, 1981, Pat. No. 4,479,241.

[51] Int. Cl.$^6$ ........................................ G06K 9/62
[52] U.S. Cl. ............................ 382/157; 382/158; 395/21
[58] Field of Search .......................... 382/14, 15, 156, 382/157, 158; 395/21–24, 26, 27, 20

[56] References Cited

U.S. PATENT DOCUMENTS 3,262,101  7/1966  Halpern ................................. 395/27
3,287,649  11/1966  Rosenblatt ............................. 395/24
3,457,552  7/1969  Asendorf ................................ 382/14
5,003,490  3/1991  Castelaz et al. ........................ 395/22

Primary Examiner—Wendy R. Greening
Assistant Examiner—Andrew B. Christensen
Attorney, Agent, or Firm—William B. Ritchie

[57] ABSTRACT

A self-organizing circuit providing improved performance and reduction in costs. The improvements are of two basic types: those that apply to improved circuit design and those that apply to improved "teaching" of the circuit. A method to allow the circuit elements to learn new patterns quickly is provided. Also, a mechanism by which serial or sequential information can be learned is disclosed. Finally, the invention includes mechanisms by which the circuits can be simplified by reducing the number of interconnections within the circuit. Improved teaching of the circuit includes ways by which the self-organizing circuit can be quickly taught new patterns. First by making each input to a subcircuit compete against the many other inputs to that subcircuit, by weighting each input according to simple Boolean functions, and lastly by incorporating a method by which information can be added to the circuit after the circuit has already learned some information. The circuit makes better distinctions between patterns by incorporating modified subcircuits which are change-sensitive and by making the subcircuit competition be sensitive to change. Lastly, a method of stabilizing and destabilizing subcircuits using signals which are sent to all nodes, lets the subcircuits organize themselves into persistent patterns.

13 Claims, 11 Drawing Sheets

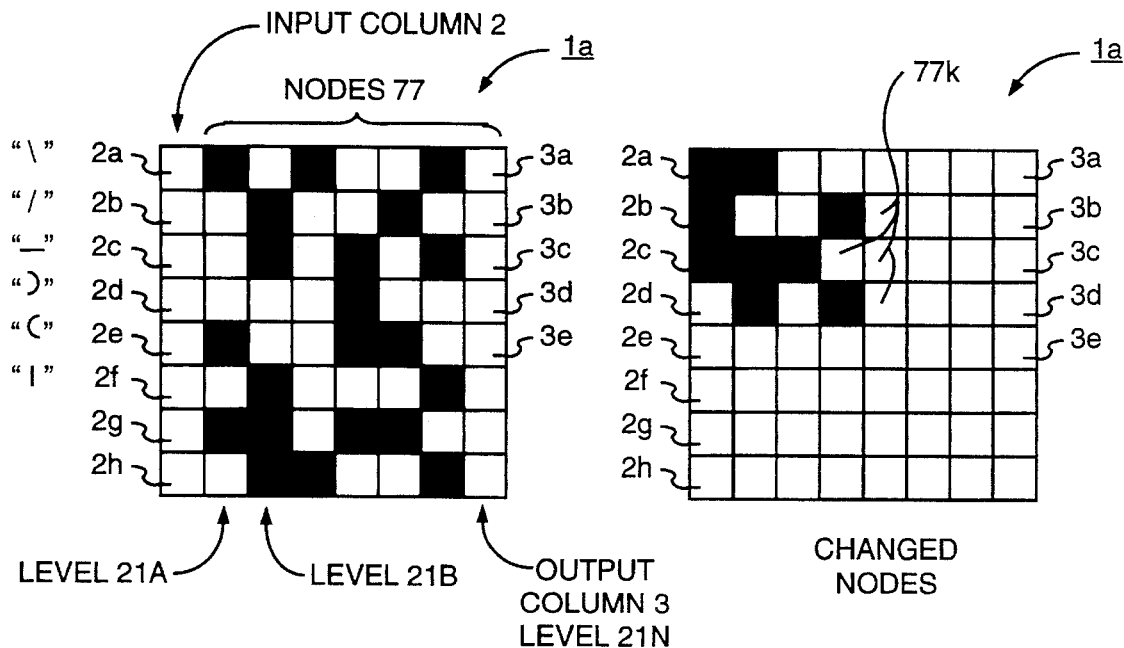
FIG. 12A
FIG. 12B
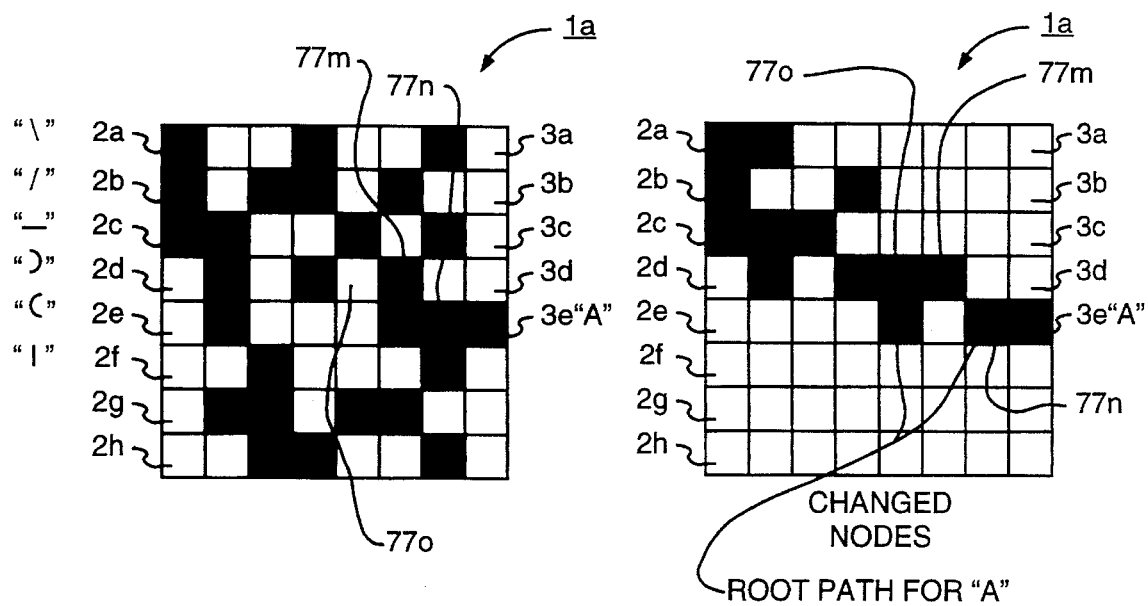
FIG. 13A
FIG. 13B

SELF-ORGANIZING CIRCUITS

This application is a continuation-in-part of application Ser. No. 07/647,645, filed Jan. 28, 1991, now U.S. Pat. No. 5,161,203, issued Nov. 3, 1992, which is a continuation-in-part of application Ser. No. 07/215,583, filed Jul. 6, 1988, now U.S. Pat. No. 4,989,256, issued Jan. 29, 1991, which is a continuation-in-part of application Ser. No. 07/202,045, filed Jun. 3, 1988, now abandoned, which is a continuation-in-part of application Ser. No. 06/911,144, filed Sep. 24, 1986, now U.S. Pat. No. 4,774,677, issued Sep. 27, 1988, which is a continuation-in-part of application Ser. No. 06/290,784, filed Aug. 6, 1981, now U.S. Pat. No. 4,479,241, issued Oct. 23, 1984.

BACKGROUND OF THE INVENTION

1. Field of the Invention

The present invention relates to systems that include mechanisms operable to receive information and to analyze that information on the basis of a learning mode of operation.

2. Description of the Related Art

The present invention adds improvements to the prior inventions of the present inventor referenced above. While these prior inventions provide adequate self-organizing circuit femures, improved performance and reduction in costs can be achieved by the additions disclosed herein.

The improvements are of two basic types: those that apply to improved circuit design and those thin apply to improved "teaching" of the circuit. Improved circuit design first includes a method to better allow the circuit elements of a self-organizing circuit to learn new patterns quickly, secondly includes a mechanism by which serial or sequential information can be learned, and thirdly includes mechanisms by which the circuits can be simplified by reducing the number of interconnections within the circuit. Improved teaching of the circuit includes ways by which the self-organizing circuit can be quickly taught new patterns. First by making each input to a subcircuit compete against the many other inputs to that subcircuit, by weighting each input according to simple Boolean functions, and lastly by incorporating a method by which information can be added to the circuit after the circuit has already learned some information. The circuit makes better distinctions between patterns by incorporating modified subcircuits which are change-sensitive and by making the subcircuit competition be sensitive to change. Lastly, a method of stabilizing and destabilizing subcircuits using signals which are sent to all nodes, lets the subcircuits organize themselves into persistent patterns.

Pattern recognition includes the ability of a circuit to detect a pattern among variables despite the fact that the pattern is not precisely the same pattern as was previously learned. The variables can be considered as any variable or set of variables from which a signal can be formed, in some way functionally related to the variables considered. The types of variables fall into two broad categories: static variables and time-varying variables. For example, when a color-blind person tries to distinguish between letters or numerals of pastel dots, he is given static variables or static information. Time-varying variables for which patterns might be recognized include audio signals, for example a person trying to distinguish between the dash and dot patterns he hears in a Morse code signal.

Clearly living organisms can accomplish this task of pattern recognition. People can recognize static information such as printed material (as the reader of these very words is now doing) and time-varying information such as how to swing a tennis racket so as to make proper contact with a tennis ball. Lower life forms also have this ability: certain ant species can recognize the foliage cover near their nests to orient themselves; certain moths can recognize the high-pitched sounds of a bat to avoid being captured; and even clams can learn primitive patterns of tactile responses which distinguish food from danger. Living organisms use electrochemical signals in the neurons of their brain or ganglion to perform this pattern recognition function.

While very complicated computers have been built which can do enormous numbers of calculations at speeds far exceeding the simple calculations done by house flies and clams, the ability of such computers to perform pattern recognition at the level of these primitive organisms has not been forthcoming. A major difference is that people tell the computers what to do whereas flies and clams tell themselves what to do. The former are essentially preprogrammed to do certain sequences in attempts to recognize patterns in space or in time while the latter self-organize themselves to "learn" to recognize patterns which are important to them. In each case, a certain amount of information is already known: in the computer it is a programming language (software) plus the myriad of interconnections in its circuitry; in the living organism it is its instincts or programmed patterns plus the myriad of interconnections in its neural circuitry.

Circuits made of wires and transistors and other electronic components could do well to have the ability to self-organize or learn as living organisms do. These circuits could lead directly to a machine which recognizes speech or recognizes handwriting among other tasks. A misconception is that people think but computers do not think— computers do only what people tell them to; however, self-organizing circuits of the type herein described mimic the ability of the brain to think or at least to do a major subtask of thinking which is pattern recognition. Hence, the line between a computer thinking and a person thinking becomes a fuzzy one.

It will be noted that in the last few years considerable research has been devoted to associative memories and "neural networks" based on an approach by John Hopfield (see, for example, Proc. Natl. Acad. of Sci., Vol. 81, pp. 3088–3092, May 1984). When "taught" patterns, these neural networks have some of the same properties of the prior patents by the present inventor (referenced above) and the present invention. For example, both methods can take arbitrary input patterns of binary information and detect when one of several patterns has been detected. Both methods use a multiplicity of "voter" subcircuits having simple binary outputs determined by combining neighboring outputs, weighting them either positively or negatively. Both methods are insensitive to noise—the input patterns during learning or recognition tasks may be only approximate copies of the exact input patterns and still detect the correct pattern. In a variation of the Hopfield algorithm Geoff Hinton and Terry Sejnowski use random outcomes of the subcircuits to better allow their networks to stabilize on a particular pattern (Cognitive Science, Vol. 9, 1985), much as the present invention uses random outcomes in eliminating the need for training of intermediate subcircuits.

But here the similarity ends. Hopfield, Hinton, Sejnowski and their colleagues all use "network optimization" methods for training their neural networks. Rather than using local outcomes of nearby nodes to adjust the interactions between subcircuits as does the present invention, neural networks optimize the network in total. Errors in associative memories are detected at the input and output subcircuits and interactions between subcircuits are adjusted based on these results rather than on local competition between the subcircuits. In addition, neural networks can only deal with combinational patterns of inputs: those whose inputs are not time-varying. The present invention can accept either combinational or sequential patterns as inputs and can output either combinational or sequential patterns as outputs.

Lastly, neural network systems are not "scalable". Training periods increase dramatically as the number of nodes in the network increase. The present invention is believed to be scalable: each new addition of information to the network requires about the same amount of training. The present invention builds on prior learning experiences to slowly build up a consistent set of responses to input patterns rather than attempting to force all input patterns into the proper response with the attendent "local minimum" problem.

SUMMARY OF THE INVENTION

An object of the present invention is to provide a method by which a circuit can organize itself into a system which can recognize patterns, which are both static (non time-varying) and dynamic (time-varying).

It is a further object of the invention to provide novel analog and digital circuits which have the ability to learn from previous experiences as a way to self-organize. These circuits have the ability to "remember" patterns for which they were rewarded and also to "avoid" patterns for which they were punished. The learning can be accomplished wholly prior to the use as a pattern recognizer; the learning can occur in conjunction with use of such circuits as a pattern recognizer; or certain information can be learned by one circuit or system and this information can be transferred to other circuits which can operate in either of the first two modes (learn-then-recognize or learn-and-recognize simultaneously).

Another object of the invention is to provide primarily analog methods of accomplishing self-organizing, to provide primarily digital methods of self-organizing and also to provide variations which include some analog circuitry combined with some digital circuitry to accomplish self-organizing.

A further object of the invention is to provide substantially parallel subcircuitry which accepts multiple inputs from other similar subcircuits, to act on these inputs, and to output signals to yet other similar subcircuits. In addition, provision is made to connect such similar subcircuits in a combination of parallel and serial manner: parallel manner meaning two or more of the similar subcircuits acting simultaneously; serial manner meaning that one or more of the subcircuits act only after another has acted.

A further object of the invention is to provide both electrical and non-electrical means by which these circuits can self-organize. Non-electrical means include pneumatic, chemical, optical or other means which obey the rules set forth for self-organizing as described herein.

Yet another object of the invention is to provide specific embodiments of circuits which can preprocess information into a form acceptable to the self-organizing circuits. The two types of information fall generally into the classes of static and time-varying information. An example of the former is visual information patterns representing printing or handwriting; an example of the latter is audio information such as recognizing patterns of speech or music.

Another object of the invention is to provide an architecture of similar self-organizing circuits. The organization or architecture is composed of a hierarchy of levels, lower levels passing on information to higher levels and vice versa in such a way as to improve the self-organizing ability and ease of learning for the system as a whole.

Still another object of the invention is to provide means for initializing subcircuits, for changing influence coefficients between similar subcircuits, and for operating subcircuits which allows the subcircuits to behave noisily such that their output signal is not completely deterministic. Included is a provision for matching the learned responses to various patterns with useful names or identifications which the operator of such a system of circuits might wish.

Another object of the invention is to provide methods by which information between different elements or subcircuits of the self-organizing system can be transmitted by time-variations of signals. These time variations encompass the range between simple changes between two or more signal levels (e.g., binary data), to pulses whose width or rate (or coded sequence of widths or rates) carries the information, the purpose being to reduce the number of inter-connections between various elements or subcircuits of the system.

Yet another object of the invention is to provide a self-learning circuit or system of circuits. While previous objects of the inventions set forth that if a self-organizing circuit is taught pattern recognition tasks by rewarding or punishing elements of that circuit to produce desirable results, this suggests that an external source provides specifically which patterns are to be rewarded or punished. But the patterns to be learned may also be arbitrary and random, though still punished or rewarded by some criterion. In this case the circuit randomly initiates its own patterns and is rewarded or punished. However, if the pattern is punished, it tends to be eliminated from those patterns which the circuit is testing; if the pattern is rewarded, it is encouraged to be used again. Self-learning of this type is a primitive form of conceptual thought; circuits which accomplish this function are disclosed herein.

Yet another object of the invention is to provide a method by which sequence of information in patterns is detected. While in many cases unordered information is satisfactory (a dozen eggs is a dozen eggs no matter which order they are taken from the box), some information is ordered and the exact nature of the ordering is critical for the patterns to be recognized. For example, in recognizing the pattern of letters which produce words, the two letters "A" and "M" taken together as a word have completely different meanings depending on order. An object of this invention is to provide circuitry which determines ordering and sequencing in patterns of both the static and time-varying varieties.

Another object of the invention includes improved circuit design by three means. First it includes a method to better allow the circuit elements of a self-organizing circuit to learn new patterns quickly, secondly it includes a means by which serial or sequential information can be learned, and thirdly includes means by which the circuits can be simplified by reducing the number of interconnections within the circuit.

Another object of the invention is to provide improved teaching of the circuit. Improved teaching includes ways by which the self-organizing circuit can be quickly taught new patterns by making each input to a subcircuit compete against other inputs to that subcircuit. The competition is based on Boolean functions which build up over a period of time and modify the influence which one one subcircuit has on another subcircuit. Depending on the behavior desired, the competition can cover the entire range where only the top subcircuit wins to where all competing subcircuits win.

To improve the self-organizing capability of the invention, a further object includes mechanisms to add new information to the system and a mechanism to balance the effects of excitory and inhibitory actions which take place within its subcircuits. This balance is achieved two ways: first, by balancing all inputs to a subcircuit and second, by balancing only those inputs whose subcircuits themselves are firing. In order to make the invention more sensitive to changes in the input, yet another object of the invention is to provide sensitivity to change both by appropriate choice of the competitive function used in teaching the circuit and also by modifications of the circuit to make them more change sensitive.

Another object of the invention is to provide a means by which signals of short duration have little influence on how quickly the system learns new patterns. In living systems, many neurons which fire only once or twice have little influence on neurons to which they are connected: they neither cause the target neuron to fire nor self-organize based on such short duration information. The present invention incorporates similar "burst functions" which amplify the influence of subcircuits which fire in short bursts and attenuate the influence of circuits which fire randomly or only for short duration. These functions make the learning of patterns by the system as a whole more stable.

An important object of the invention is to provide a network whose principle means of reacting to input information is the change in state of its nodes. Change of state means either a firing node stops firing or a non-firing node begins firing. However, only consistently changing nodes are generally included: those changing too quickly or too slowly are eliminated from consideration.

Combining learning rules that incorporate both change-sensitive and burst functions produces a method by which a network of subcircuits eliminates inputs that change too quickly as well as those that change too slowly. Such learning rules can be used in novel ways to teach the network to associate and distinguish its input information. As each new piece of information is learned, it must be either compared to previous information (association) or contrasted with previous information (distinction); universal signals, similar to those determining correctness or incorrectness, operate universally on all subcircuits to self-organize under rules appropriate to either comparing or contrasting.

The method by which the universal signals operate is to stabilize or destabilize appropriate subcircuits. On stabilizing, the inputs to a subcircuit are modified in a way that prevents the subcircuit from changing state (changing from firing to non-firing or from non-firing to firing). Destabilizing is the opposite: inputs to the subcircuit are modified in a way that encourages the subcircuit to change state.

Yet another object of the invention provides for a bias of the system's subcircuits. The bias assures that a subcircuit requires a minimum of input from other subcircuits to fire consistently or to not fire consistently. Without the bias, the subcircuit can fire inconsistently. The strength of the bias is also important. If the bias is strong, input from several subcircuits is needed to make the subcircuit fire; if the bias is weak, input from a single other subcircuit can make it fire. A strong bias gives the subcircuit an AND-like or NAND-like character: two or more inputs are needed to influence the subcircuit's outcome. A weak bias gives the subcircuit an OR-like or NOR-like character—a single input can change the the subcircuit's outcome.

In addition to bias, clipping is an important characteristic of the subcircuits. Clipping is the method by which a subcircuit will not fire if too many other subcircuits influence it. If clipping is strong, input from a single other subcircuit will make it change; inputs from other subcircuits will prevent it from changing. Weak clipping allows a few subcircuits to change the outcome, while more than these few prevents the subcircuit from changing. Clipping gives the subcircuit an XOR-like or XNOR-like character: some input influences the outcome, but too many inputs prevent the influence.

The proper values of bias and clipping produce a network of subcircuits in which changes in the subcircuits propagate neither too readily nor with too much difficulty. An object of the invention is to use such networks to provide a means of linking patterns of input information with patterns of output information of the entire network. Tunneling is a means by which changes to the input information are made to propagate across the network to produce output information; densifying is a means by which the propagated changes are reinforced such that when the same input information occurs, the same output information will be produced.

A final object of the invention is to provide a means by which information in the network of subcircuits will propagate across the network in the proper direction. Such directed networks produce more efficient self-organizing in conjuction with tunneling and densifying.

The foregoing objects are attained, generally, in a system that includes a self-organizing mechanism connected to receive a plurality of input signals representing constituent elements of input information and operable to effect identification of the pattern of constituent elements by combining the influence which each constituent element has on the pattern of constituent elements, the self-organizing mechanism including multilevels with feedback or communication between higher levels and lower levels to aid in identification of the pattern, the self-organizing mechanism being operable to provide an output related to the pattern, a correction mechanism connected to modify the self-organizing circuit means by varying the influence which each constituent element has on the pattern of constituent elements as occasioned by accurate and inaccurate identification of the input information.

The system also can include a mechanism to vary the influence which each constituent element has on an evaluation of the pattern of constituent elements based upon Boolean functions between the input signals to each said multilevel circuit and its outputs; and a mechanism connected to vary said influence based upon competition among the input signals. In addition, the system can include a mechanism to add new information to the system; and a method to balance the effects of excitory and inhibitory actions which take place within its subcircuits.

BRIEF DESCRIPTION OF THE DRAWINGS

The invention is described hereinafter with reference to the accompanying drawing in which:

FIG. 12A shows the output states of a simplified circuit shown in FIG. 1;

FIG. 12B shows how the output states of FIG. 12A change when the input signals to the circuit change;

FIG. 13A, 14A, and 15A show the output states of the circuit shown in FIG. 12A as the circuit learns various kind of input signals;

FIG. 13B, 14B, and 15B, show how the output states of FIG. 13A, 14A, and 12A, respectively, change from that of FIG. 12A as the circuit learns various kinds of input signals;

DETAILED DESCRIPTION OF THE INVENTION

Figure 1:
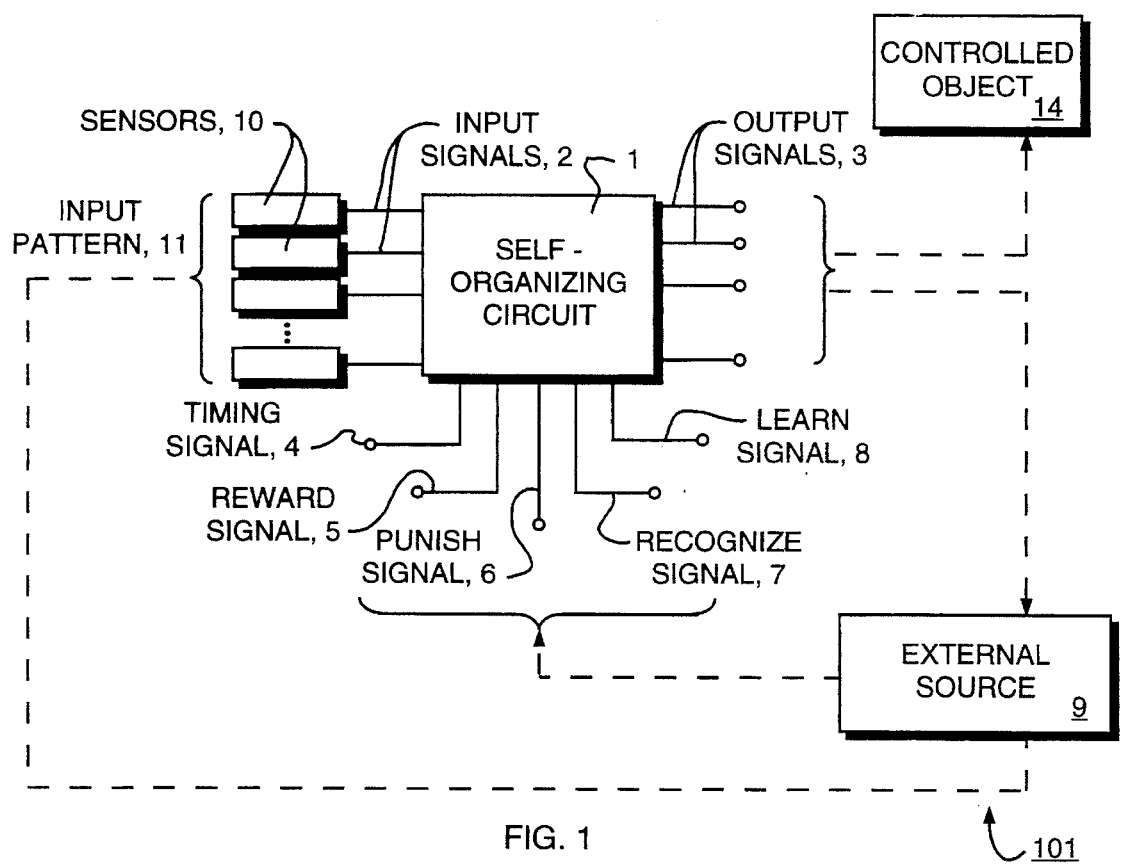
FIG. 1 is a diagrammatic representation of a system that includes a self-organizing circuit of the present invention.

There now follows a brief explanation of the invention with reference to FIG. 1 which shows a system 101 that includes transducers or sensors 10 to sense an environmental condition or some other input pattern thereto at 11. The sensor or sensors 10 are operable to process that input to provide an input signal at 2 which includes information to be analyzed. A self-organizing circuit 1, connected to receive that input signal, is operable to effect analysis of components of constituent elements of the input signal and to provide an output signal at 3.

In the discussion which follows, the various signals as well as the entire inner workings of the self-organizing circuit 1 are assumed to be electrical signals. This need not be the case since analogous circuits can be derived which are non-electrical. For example, the self-organizing circuit 1 could be implemented in fluidics using pressure signals instead of voltage signals or in thermics using temperature signals instead of voltage signals (see, for example, U.S. Pat. No. 4,137,964 by the present inventor). However, for simplicity, further discussion will consider only the electrical implementation as the preferred embodiment.

An external source 9 (e.g., a computer), as explained later herein, is connected to apply modified inputs as inputs 5,6,8 and 7 (e.g., a reward signal, a punish signal, a learn signal and a recognize signal, respectively) to the self-organizing circuit 1; the input signals at 5, 6 serve to correct errors in the output signal at 3 occasioned by inaccurate analysis by the self-organizing circuit. A timing signal may be applied at 4 for purposes later discussed.

Figure 2:
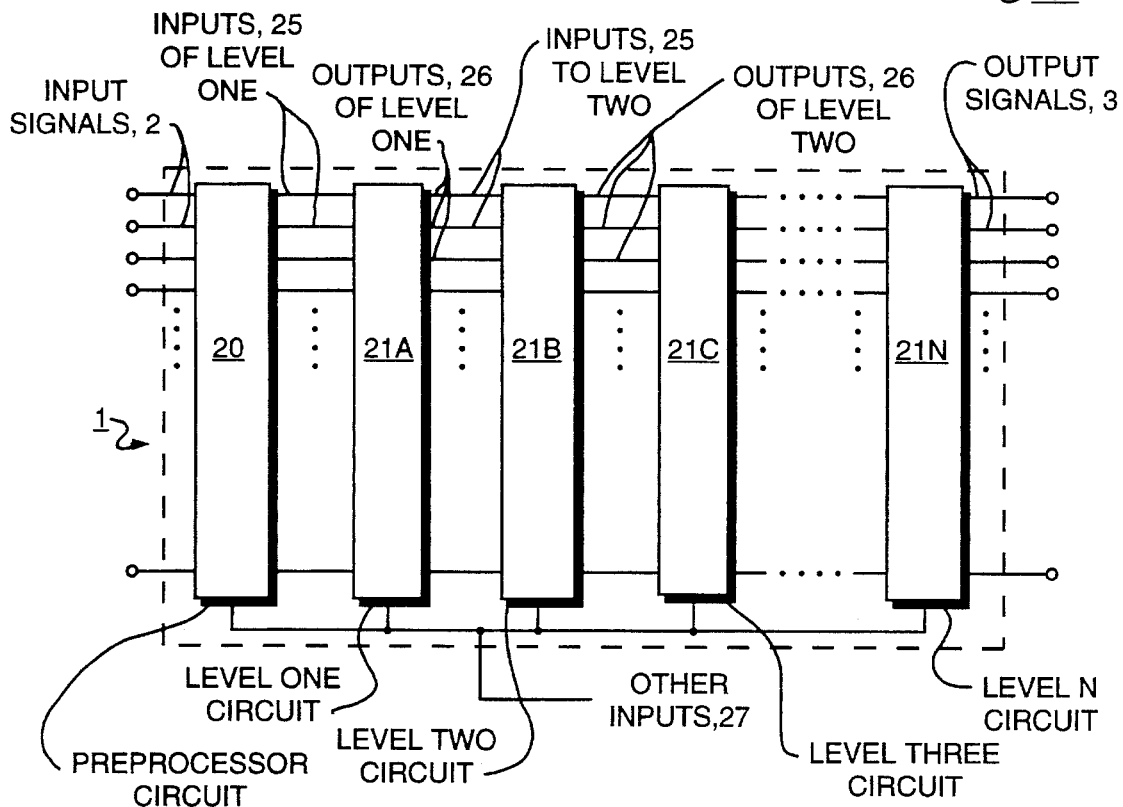
FIG. 2 is a diagrammatic representation of one form the self-organizing circuit of FIG. 1 can take, and shows a self-organizing circuit that includes a preprocessor circuit and a plurality of subcircuits or level circuits.

Typically, the self-organizing circuit 1, as shown in FIG. 2, consists of several interacting elements. The system 101 may contain a controlled unit 14 (e.g., a mechanical mouse, whose functions are directed by signals 3 from the self-organizing circuit). (In order to simplify the explanation herein, the label 2 designates signal paths or the like interconnecting the sensors 10 and the self-organizing circuit 1, but hereinafter 2 is used also to designate the signal on those paths; and a similar approach is used as to other labels and either the signal path or the signal on that path.)

In the description that follows, the self-organizing circuit 1 will be discussed. Generally, the circuit 1 has many parallel signals 2 as input; they are usually binary: electrical signals having either one or another of two states (e.g., a high voltage and a low voltage). The signals 2 are fed into the circuit 1 which organizes the inputs to provide various signals 3, deemed by an external source 9 to be either desirable or undesirable. In some cases it is necessary for this outside source (e.g., a computer operating the circuit) to identify which output signals 3 are associated with appropriate input patterns 11.

In addition to the signals 2 and 3, certain other signals to the circuit 1 may be required. First, a timing signal 4 may be required to initiate various modes of operation of the circuit, for example, learning mode or recognizing mode. The timing signal 4 can be a simple binary signal or perhaps a series of such signals as are currently used on digital computers for sequencing events. Secondly, reward signals 5 and punish signals 6 are other examples of input signals initiated by the external source 9 or an operator whose inputs pass through an appropriate device 9. A reward signal 5 tells the circuit 1 that a pattern 11 which it recognized was a correct one; a punish signal 6 tells the circuit 1 that a pattern 11 which it recognized was an incorrect one. Other modes of signals 5 and 6 serve to initiate other behaviors of operation of the circuit 1 such as association behavior or distinction behavior. Other signals which may be required are a learn signal 8 and a recognize signal 7. A more primitive form of the circuit 1 can have a learn mode initiated by the learn signal 8 (during which it learns only to recognize patterns) followed by a recognize mode initiated by the recognize signal 7 when the circuit 1 uses the organization provided by the learning mode to perform useful recognition tasks.

The external source 9 used to monitor the circuit 1 can be of several types. It can be a mechanism that permits a human operator to direct the circuit 1 as mentioned above, it can be a mechanism that permits the environment to direct the circuit 1, or it can be another electronic circuit which recognizes the correctness of a response to a pattern 11 and rewards or punishes the circuit 1.

The input patterns 11 can be provided in several ways by the external source 9 as suggested above. These patterns 11 can be patterns presented to the circuit 1 by the human operator or the environment appropriately transformed into the proper binary mode electrical signals for use in the circuit 1 by the sensors 10. The sensors 10 can measure any of the common variables used in engineering disciplines. A partial list of the sensors include optical or light sensors, quantity sensors, radiation sensors, frequency variation sensors, auditory sensors, stress or strain sensors, position sensors, acceleration sensors, temperature sensors, heat flow sensors, time sensors, chemical composition sensors, proximity sensors, voltage sensors, current sensors, magnetic field sensors and force sensors. The electrical inputs at 2 can also be the output signals of another self-organizing circuit, as later discussed with reference to FIG. 2.

In addition to patterns 11 derived from the environment (or some other source of information) by the transforming sensors 10, the inputs may be triggered randomly by the circuit 1 itself as it explores ways in which to reward or punish. The self-organizing circuit 1 can adjust itself or accommodate to an environment with little prior knowledge of what the environment is. For example, if the inputs 2 to the circuit 1 represent each of four directions to which a mechanical mouse 14 controlled by the circuit 1 can turn at each cell within a planar, cartesian maze, the reward might be given for traversing a shorter path through the maze and a punishment given for traversing a longer path. Initially, the mouse 14 randomly picks directions and eventually finds its way through the maze. But as it tries more and more times it is rewarded for shorter routes and punished for longer routes; the self-organizing circuit 1 tends to find the shortest path by eliminating long routes and encouraging short routes.

The input patterns 11, which can represent analog information, can be transformed into digital binary data by the Albus Method (BYTE Magazine, July 1979, p. 61, James Albus). In this method, several sensors 10 act over the range of some analog variable. The responses of the sensors 10 overlap various arbitrary values of the analog variable such that any particular analog value is represented by several simultaneous digital signals by some subset of the total number of digital sensors 10.

Information such as audio information, whose time varying characteristic periodicity is not appropriate for the circuit 1 (e.g., is at too high a frequency), can be represented by overlapping filters (as the sensors 10) whose outputs 2 indicate various frequency bands which the audio information contains. These sound spectrograms or voicegrams are standard representations of audio information; digital decomposition of the audio signal into constituent frequencies is a common technique for transmitting acoustic information digitally. Similarly static frequency patterns such as spectrographs, can be decomposed into a number of discrete frequencies and/or amplitudes for recognizing the patterns of compositions and the like. The focus of this invention is not how the various input sensors 10 derive binary information but, rather, how the electrical signals 2 self-organize to form the recognition signals 3.

Just as the input signals 2 are derived from input sensors 10, the output signals 3 can interact with the external source 9 (or some controlled unit 14) in various ways. If the external source 9 is the environment, it might include such output devices as motors which operate manipulator hands (which could be considered to be the controlled unit 14), valves in hydraulic circuits or innumerable other ways in which the electrical signals 3 alter the environment through mechanical, electrical, thermal, hydraulic or chemical amplification of the electrical output signals 3. The output can also be simply information as used by another electrical circuit or computer. This invention does not primarily concern itself with what the output signals 3 are used for, except perhaps as they directly or indirectly affect the other signals operating on the circuit 1, as previously described.

The principal aspect of the present invention is how the self-organizing circuit 1 is able to organize itself in various ways. To elucidate the different aspects of this invention, the circuit 1 of FIG. 1 is subdivided into subcircuits called levels, as shown in FIG. 2. The signals (typically binary in form) from the sensors 10 of FIG. 1 feed first into a preprocessor circuit 20 whose outputs 26 are inputs 25 to a level one circuit 21A. Each level circuit 21A . . . 21N has outputs 26 which act as inputs 25 to the next higher level. The level one circuit 21A feeds its outputs 26 to the level two circuit 21B via connections 26; the level 21B inputs 25 are the same as the level 21A outputs 26. Level 21B outputs 26 become level 21C inputs 25 and so forth until the last level N circuit 21N is reached. The outputs 26 of the level N circuit 21N are the output signals 3 of the circuit 1.

This hierarchical form is not the most general; it is presented only to simplify the explanations which follow. As in neural connections, there can be feedback signals which connect from a higher level to a lower level, e.g., the higher level circuit 21B might connect to the lower level circuit 21A, via interconnections 26, but with a signal flow from the level two circuit 21B to level one circuit 21A rather than from the level one circuit 21A to the level two circuit 21B as previously suggested. Moreover, the different levels can "pass through" a signal from a lower level to a higher level; thus output signals of one level can be available as input not only to the next higher level, but to levels even farther up the hierarchical chain. For example, the preprocessor circuit 20 can have its outputs go into the level one circuit 21A, which may then be sent on to the level two circuit 21B such that both the level one circuit 21A and the level two circuit 21B have the outputs of the preprocessor circuit 20 available for acting upon.

Lastly, the FIG. 2 illustration is not meant to imply that the same number of inputs 25 would interconnect all the subcircuits shown. In general, there may be more or less interconnections 26 between two particular levels than between two other levels. Also shown in FIG. 2 are other inputs 27 which are fed to all circuits. These other inputs 27 are meant to include signals such as the timing signal 4, the reward signal 5, the punish signal 6, the learn signal 8 and the recognize signal 7 in FIG. 1.

In FIG. 2, the preprocessor circuit 20 has been distinguished from the level circuits 21A through 21N because the circuit 20 has no self-organizing capability. The preprocessor 20 acts in a programmed manner on the input signals 2 to convert them into the input signals 25 which will facilitate the self-organizing capability of the self-organizing level circuits 21A through 21N. While the preprocessor circuit uses Boolean operators such as AND and OR gates, the circuit 20 does not learn (its connection strengths do not change) as in self-organizing circuits 21A through 21N. The form the preprocessor circuit 20 takes depends to a great extent on the patterns which the circuit 1 is attempting to recognize, whether static or time-varying, and also upon the types of sensors 10 used to generate the signals 2 fed into the circuit 20.

The important facet of the self-organizing circuit 1 is not the preprocessor circuit 20, but, rather, the level circuits 21A through 21N. The preprocessor circuit 20 is discussed in U.S. Pat. Nos. 4,479,241, 4,774,677 and 4,989,256 with regard to specific tasks which the circuit 1 might perform. Examples used are a static pattern recognition task (recognizing letters of the alphabet) and a time-varying pattern recognition task (recognizing speech). Each type of pattern recognition task requires a specialized preprocessor circuit 20 which is especially designed for the specific task.

COMPONENTS OF LEVEL CIRCUITS

Figure 3:
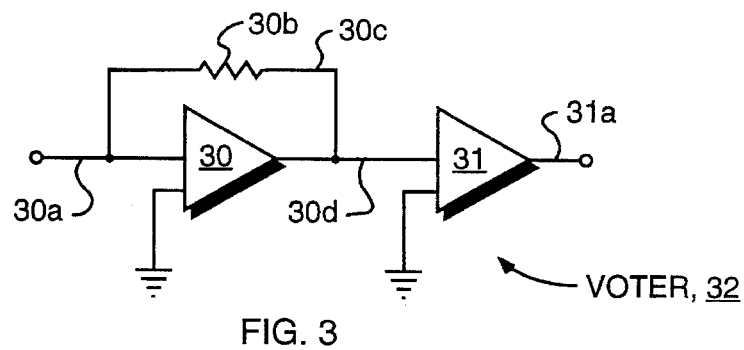
FIG. 3 is a schematic representation of a multiple-input summing junction.

Self-learning circuits of the present invention "vote" and have "path reinforcement." In an analog circuit, voting can be implemented by the multiple-input voting subcircuit or "voter" shown at 32 in FIG. 3. The voltage output signal at connection 30d is proportional to the sum of the currents—i.e., the total current—input at connection 30a. A high-gain amplifier 30 assures that the current at 30a multiplied by the resistance of a resistor 30b, connected via feedback path 30c, equals the voltage at the connection 30d. A subsequent high gain amplifier 31 outputs a binary voltage signal at connection 31a, depending on whether the voltage at 30d is positive or negative. The binary signal at the connection 31a has one of two states, thus specifying whether the voter 32 has fired: if the summation of currents into the connection 30a is positive, the voter 32 fires (i.e., attains one state at the connection 31a); if negative, it does not fire (i.e., stays at the other state at the connection 31a). Henceforth, the term "active" state will be synonymous with a binary one meaning that a particular binary device has fired; an "inactive" state will be synonymous with a binary zero, meaning that the device has not fired.

TRANSMISSION GATES

One method of path reinforcement uses digital-to-analog converters (DACs); it is presented here to illustrate one example of how to implement the present invention. A DAC takes a multiwire digital input signal and converts it to an electric current—the electric current being proportional to the binary weighted value of the input signal. One simple DAC can be made of C-MOS (complementary-MOS) inverters and transmission gates, as shown in FIG. 4A, FIG. 4B, FIG. 5A and FIG. 5B.

Figure 4A:
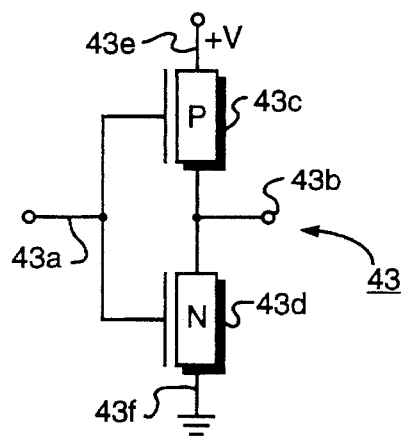
FIG. 4A is a diagrammatic representation of an inverter whose shorthand symbol is shown in FIG. 4B.
Figure 4B:
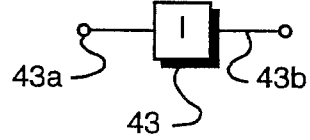

An inverter 43 is shown in FIG. 4A; its shorthand symbol is shown in FIG. 4B. Connection 43a is the input connection to the inverter 43 through which a voltage signal is fed. A positive voltage signal at the connection 43a turns the P-channel MOS element 43c OFF while simultaneously triggering ON an N-channel MOS element 43d, which causes the voltage at the output connection 43b to drop to the ground state voltage (0) which is provided at connection 43f. In a similar manner, a negative voltage at the connection 43a causes the output voltage at 43b to rise to the positive supply voltage (+V) provided at connection 43e.

Figure 5A:
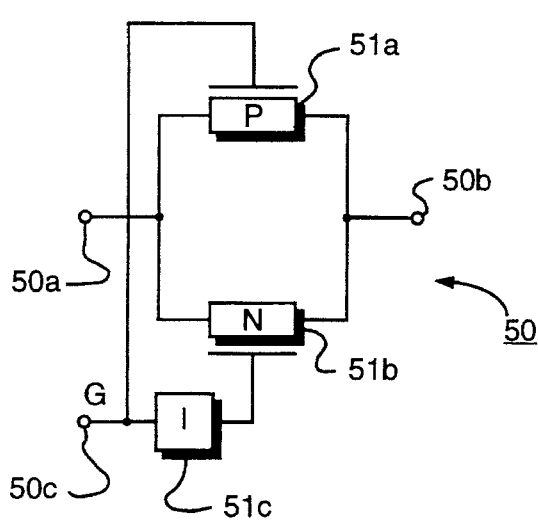
FIG. 5A is a diagrammatic representation of a transmission gate whose shorthand symbol is shown in FIG. 5B.
Figure 5B:
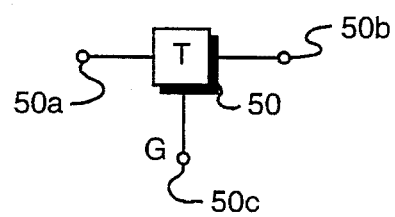
FIG. 5C is a diagrammatic representation of an analog delay circuit and FIG. 5D is a diagrammatic representation of a digital delay circuit, a shorthand symbol for both being shown in FIG. 5E.

A transmission gate 50 is shown in FIG. 5A; FIG. 5B shows its shorthand symbol. An input current signal at connection 50a in FIG. 5A is transmitted through either a P-channel MOS element 51a or an N-channel MOS element 51b if the gate signal labeled G at connection 50c is in one binary state; but no current is transmitted if the gate signal G is in its other state. An inverter 51c insures that 51a and 51b are either both ON (so current can flow in either direction between connections 50a and 50b) or both OFF.

DELAYS

Figure 5D:
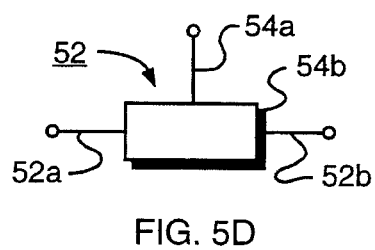
Figure 5C:
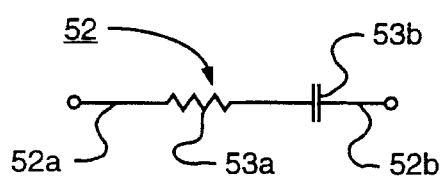
Figure 5E:
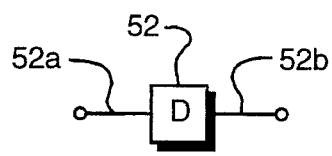

Shown in FIG. 5E is a generalized delay 52 with inputs 52a and 52b. The delay is a common electronic component which can, in many implementations of a self-organizing circuit, improve the ability of the complete circuit 101 to organize itself especially for sequential information.

FIG. 5C shows the analog implementation of the generalized delay 52; FIG. 5D shows its digital implementation. In an analog circuit 101, the delay 52 is simply a resistor 53a in series with a capacitor 53b; when fed a step input of current at connection 52a, the current at output connection 52b slowly builds to the input current 52a, effectively delaying the output 52b with respect to the input 52a. In a digital circuit 101 the shift register 54b is used instead of the analog delay. It is connected between digital input 52a and the digital output 52b; the input value is shifted toward the output connection 52b for each signal on clock input 54a.

WEIGHTS

Figure 6A:
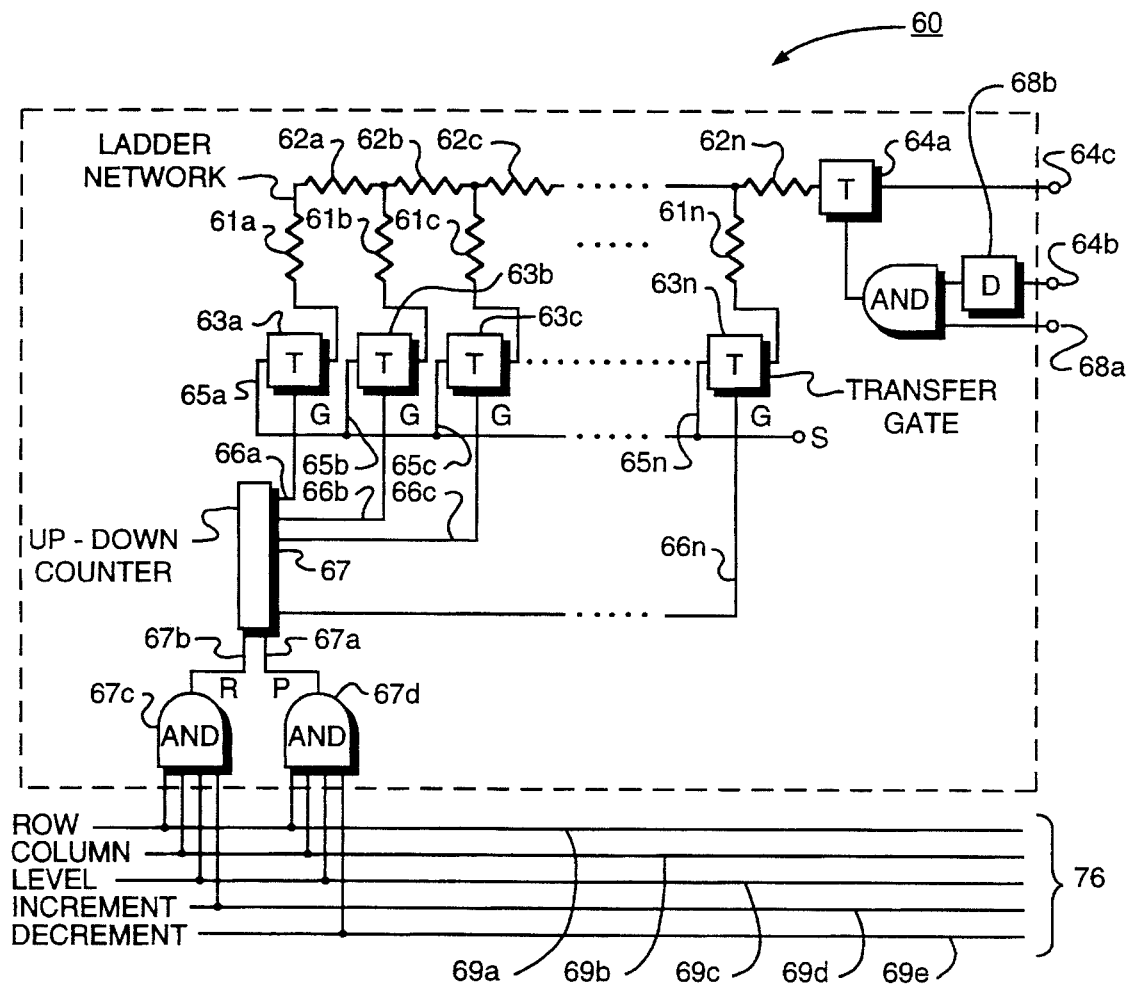
FIG. 6A is a diagrammatic representation of a digital-to-analog converter (DAC) whose shorthand symbol is shown in FIG. 6B.
Figure 6B:
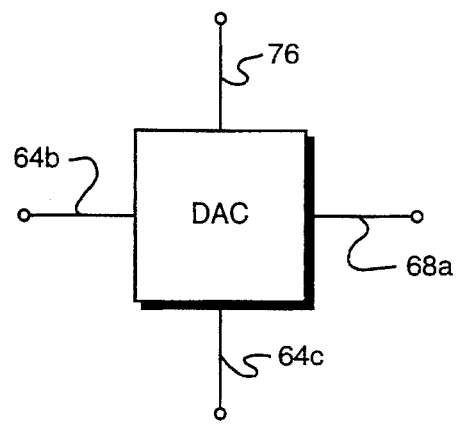

The digital-to-analog converter (DAC) marked 60 in FIG. 6A is composed of a ladder network of resistors 61a ... 62n; FIG. 6B shows a shorthand symbol for the DAC 60. Note that other DACs than the "binary-weighted" DACs discussed here are possible. For example, a sequentially-loading DAC based on charge coupled devices or bubble memories may be used in other designs of self-organizing circuits. Resistors 61a ... 61n are sized properly with resistors 62a ... 62n such that when a set of transmission gates 63a ... 63n is enabled by the binary number in an up-down counter 67, the current output fed to the transmission gate 64a is proportional to the value of a binary number stored in the counter 67 and applied to the transmission gates via connectors 66a ... 66n. One of the signal inputs of each transmission gate 63a ... 63n is connected to a supply voltage labeled S which can be either positive or negative; a positive supply S will produce a current flow into the transmission gate 64a, a negative supply S will drain current from the transmission gate 64a. A gate signal 64b (labeled G1 in FIG. 7A) is delayed by the delay 68b. After the delay, current flows through the transmission gate 64a to the output connection shown at 64c whenever the clock pulse 68a is simultaneously firing.

Figure 7A:
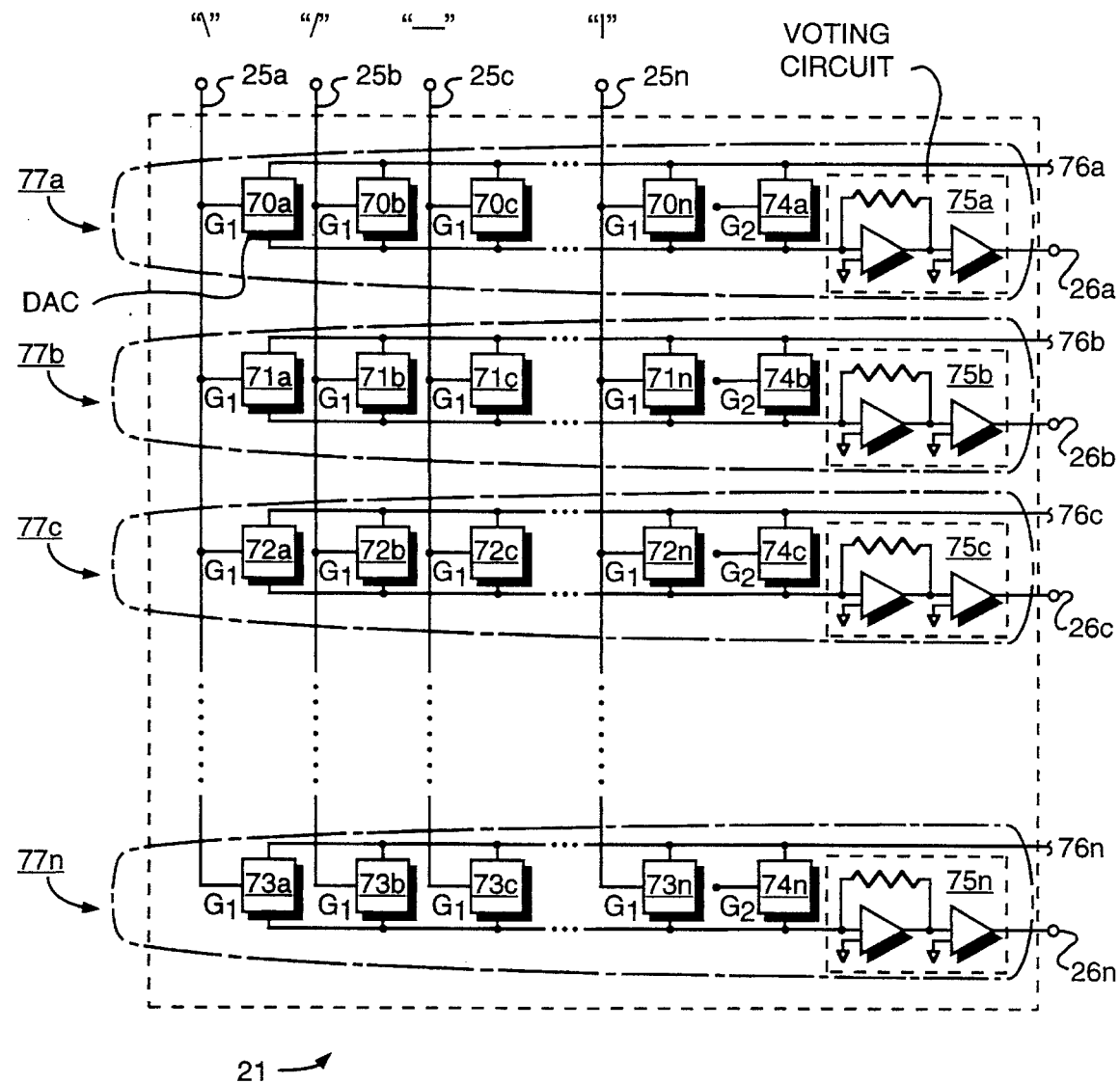
FIG. 7A is a diagrammatic representation of one form the subcircuits or level circuits of FIG. 1 can take.

The DAC 60 works as follows. For simplicity assume that the delay 68b is zero. Each connection 66a ... 66n represents a bit of the binary number stored in the up-down counter 67. Hence, if the binary number in the counter 67 is zero, no signals will be present at connections 66a ... 66n and none of the transmission gates 63a ... 63n will allow current to flow to or from the supply connections shown at 65a ... 65n; in this circumstance, the output current at 64c will be zero when the gate G1 in FIG. 7A is enabled simultaneously with the clock signal 68a. If the binary number in the inverter 67 is "all ones", all the transmission gates 63a ... 63n will allow current to flow. The current flow into or out of the connection 64c will be its maximum when the gate G1 is enabled simultaneously with the clock signal 68a. This maximum current is called WMAX in the equations which follow. Any binary number between zero and "all ones" will cause a current flow at the connection 64c proportional to the value of the binary number in the counter 67, current being drawn into the DAC 60 for a negative supply and current flow being out of the DAC 60 for a positive supply.

The up-down counter 67 is a particular type of binary register which counts up (i.e., the binary value of signals 66a ... 66n is incremented by one) each time it receives a reward signal 67b (at terminal R in FIG. 6A and 6B) and counts down (i.e., the binary number is decremented by one) each time it receives a punish signal 67a (at terminal P in FIG. 6A and 6B). A reward signal 67b adds the binary number one to a binary number stored in the counter 67; a punish signal 67a subtracts one bit from the counter's binary number. The binary number is stored in the counter 67; it remains the same whether or not signals are transmitted via connections 66a . . . 66n or not. Only the punish or reward signals, 67a and 67b, respectively can change the values of the counter 67.

In this particular configuration, the punish and reward signals 67a and 67b are activated by a punish/reward bus 76. The bus 76 is composed of five signal lines: a row signal 69a, a column signal 69b, a level signal 69c, an increment signal 69d and a decrement signal 69e. The first three signals 69a, 69b, and 69c identify the particular DAC 60 in the self-organizing circuit 101. These three are combined in an AND gate 67c with the increment signal 69d to form the reward signal R; they are combined in an AND gate 67d with the decrement signal 69e to form the punish signal P. Note that more complex bus addressing means (e.g., a serial code transmitted on bus 76 with appropriate decoders at each DAC 60) can reduce the wiring interconnections of the circuit 1.

In operation, the DAC 60 accomplishes "path reinforcement." In FIG. 6B, a current flows into or out of the connection 64c, according to how much it has been rewarded or punished. The current flows when the delayed input signal 64b occurs simultaneously with the clock signal 68a. A highly rewarded and little punished DAC 60 will have a large current flow; a highly punished and little rewarded DAC 60 will have little current flow. While these circuits have been shown in a C-MOS implementation, it should be noted that similar circuits can be designed in many other types of electronic implementation. In addition, the effect of inhibiting or reinforcing a signal is shown here simply by the choice of supply voltage for the DAC 60; a more complicated circuit may well have the sign of the DAC 60 supply voltage determined by the binary number stored in the counter 67. Hence, in this latter variation, a much-punished DAC 60 would drain current from the connection 64c while a much rewarded DAC 60 would add current to the connection 64c.

LEVEL CIRCUIT OPERATION

Shown in FIG. 7A is a simple configuration whereby a plurality of DACs 70a . . . 74n (like the DAC 60) and a plurality of voters 75a . . . 75n (like the voting circuit 32) are combined to give a level circuit 21. The circuit 21 on FIG. 7A is meant to imply any of the self-organizing level circuits of FIG. 2 (e.g., circuits 21A . . . 21N). Inputs to the circuit 21 are denoted as connections 25a . . . 25n; each input signal 25a . . . 25n is connected to every column of DACs. For example, the connection 25a routes an input signal to the first DAC in every row (i.e., DACs 70a, 71a . . . 73a); the connection 25b routes its signal to the second DAC in each row (i.e., DACs 70b, 71b . . . 73b). The input signals 25a . . . 25n are connected to the G1 gate inputs (i.e., the input 64b in FIG. 6A and 6B) of each respective DAC as discussed with reference to FIG. 6B. Although the circuit 21 is shown in a hardware implementation, the behavior of such a circuit can also be simulated by common software techniques.

THRESHOLDS

Besides the "path-related" DACs 70a through 73n, the circuit 21 also has "threshold" or "bias" DACs 74a . . . 74n. A threshold DAC 74a . . . 74n is one which modifies current to its respective voter 75a . . . 75n without regard to inputs 25. By contrast, the "path-related" DACs 70a . . . 73n modify the current going to the respective voters 75a . . . 75n based on their inputs 25. The purpose of the threshold DACs 74a . . . 74n is to insure that input signals to the voter 75a . . . 75n are offset properly as more and more learning experiences occur; this will be discussed in more detail later.

The outputs of all the DACs 70a . . . 74n either add or drain current from their respective voters 75a . . . 75n. If this net current flow to the voter 75 is positive, a binary one signal will occur at the respective output gate 26; if it is negative, a binary zero output signal will occur at the connection 26. The output signal 26, either a binary one or a binary zero, occurs simultaneously with the clock signal 68a.

UNCERTAINTY

In some embodiments of the voting circuits 75a . . . 75n, a zero-mean noise current is added to the current flowing to the voter 75. The noise is zero-mean: it has equal likelihood of being positive (adding current to the voter 75) or negative (draining current from the voter 75). The noise has a band width higher than the clock frequency.

The effect of the noise is to produce an uncertain outcome of the voter circuit 75. If the net current to the voter 75 (excluding the noise) was very negative, the voter 75 would not likely produce an output signal 26 unless the noise current, at the moment of the clock signal 68a, was greater than the net current. Similarly, if the net current was very positive, the noise current would not likely prevent the output 26 from occurring. However when the net current to the voter 75 is near zero, the noise current has its greatest effect by preventing an output 26 which might otherwise have been an output, or by producing an output 26 which might otherwise not have had an output signal.

When the noise current to voter 75 is low (its standard deviation is small compared to the maximum current WMAX produced by a DAC 60), it has little effect: the output 26 closely corresponds to the net current to the voter 75. However when the noise current is high, the voter 75 outcome is uncertain. Circuits 75 which should not have fired occasionally do; those which ought to have fired occasionally do not. Neurons in the cortex have the same tendency to be very noisy: their outcomes are not completely determined by the net currents flowing into them.

CLOCKING AND DELAYS

In the preferred embodiment of level circuits 21A . . . 21N (as well as the preprocessor circuit 20) the outputs 26a . . . 26n are clocked. That is, the transfer of signals from these circuits occurs at fixed time increments T. Since all DACs 70a . . . 74n are connected to a clock signal 68a (FIGS. 6A and 6B), current is only injected into the voters 75a . . . 75n at fixed intervals. If the time from the beginning of one clock cycle to the beginning of the next is its period T, then the DACs 70a . . . 74n only provide current at multiples of T.

The duration of the clock signal is necessarily less than its period T (since most digital components require an edge to trigger on). The clock signal, then, is active for only a portion of its period T. The effect on the DACs 70a . . . 74n is a pulse of current every clock period. Since the clock signal duration is typically half or less of its period, the voters 75a . . . 75n must react quickly to the current pulse from the DACs, to reliably convey the information from the inputs 25a . . . 25n. Hence the inherent time constant of the voters 75a . . . 75n is small compared to the clock period T or to the duration of the clock pulse 68a.

On the other hand, the duration of delay 68b (FIG. 6A) associated with each DAC 70a . . . 74n is often greater than T. While there can be as little as no delay, the delay 68b may also be as great as many clock time periods. In digital implementations of the circuit 101, shift register 54b (FIG. 5D) is also clocked at the same time period T via clock signal 54a. Hence, time delays of DACs 70a . . . 74n will have only integer values of T from zero to some multiple of T. However, in strictly analog embodiments of the circuit 101 precise clocking of the delays 68b and the DACs 70a . . . 74n is not required.

In at least one preferred embodiment of the present invention, each input 25 is associated with a delay 68b (also shown as 52 in FIG. 5C, 5D and 5E), hence messages from some other sub-circuit or level is delayed in time before each sub-circuit or level weights relative amounts of negative and positive inputs thereto and votes whether or not to pass along information to further subcircuits or levels. The delay 68b can be as simple as a first- order lag circuit common in many analog control circuits. Note that the delays 68b of the threshold DACs 74 . . . 74n can also act to give the voters 75a . . . 75n a delayed action. By draining the voters faster than they can fill with current, the voter action can be delayed in some self-organizing circuits.

NODE CIRCUITS

The combination of a row of DACs 70a . . . 70n, threshold DAC 74a and the voter 75a is called a "node" circuit 77a (FIG. 7A). There are many such node circuits 77a . . . 77n in each level circuit 21 according to the present teachings; each mimics the operation of a neuron. The row of DACs 70a . . . 70n mimic the dendrites which interconnect a neuron in a living organism to other neurons: they weight the effect of inputs from other neurons. By this analogy, the binary numbers stored in DACs 70a . . . 74n are called "weights". The voter 75a in combination with threshold DAC 74a mimics the neuron's cell body and how it fires in response to weighted inputs from other neurons. Each row of the level circuit 21, then, represents a node circuit like circuit 77a. Each level circuit 21A . . . 21N represents a column of these node circuits 77a . . . 77n. All the level circuits 21A . . . 21N represent an array of node circuits.

Note that in an actual level circuit 21, connecting each column input such as input 25a, to each node circuit 77a . . . 77n is very inefficient from a wiring viewpoint. A more efficient circuit has only "local" connections: each node circuit 77a . . . 77n need only be connected to a few of the input signals 25a . . . 25n (henceforth simply called the "inputs 25" but referring to any of the input signals 25a . . . 25n to a particular level circuit 21A . . . 21N). So long as each node circuit, such as circuit 77a, has several different inputs 25, the circuit 101 will self-organize efficiently without requiring the massive interconnection requirement that all inputs 25 be connected to each node circuit. In other words, the input signals 25 include only some of all the possible input signals available from either a lower level circuit or fed back from a higher level circuit. FIG. 7A shows the interconnections to all inputs 25 only for completeness.

COMPETITION AND BOOLEAN FUNCTIONS

To understand how the circuit 101 operates, let it be assumed that two modes can occur: learning and recognition. In the learning mode, the circuit first learns to respond to various patterns of inputs 2 to give proper outputs 3. Later, in a recognition mode of operation, the learned responses are used to identify the input signals 2: active output signals 3 indicate a recognized pattern of input signals 2.

In the learning mode, the circuit 101 operates in the following manner for a single level 21. The discussion here is simplified to only consider a single level 21 in order to clarify the system's operation. However, in general, each pattern 11 to be recognized uses many levels 21A . . . 21N with interconnections between higher levels and lower levels via feedback paths, connections from lower levels directly to several higher levels and connections within a single level.

Let it be assumed, for example, that the external source 9 in FIG. 1 is a computer which is capable of applying input patterns 11 to the sensors 10, and capable of interpreting the output signals 3 of the entire self-organizing circuit 1. It is also capable of storing within its own memory both the present state of each of the inputs 25a . . . 25n and each of the outputs 26a . . . 26n of each of the level circuits 21A . . . 21N (henceforth simply called the "inputs 25" and the "outputs 26" but referring to any of the input signals 25a . . . 25n or the output signals 26a . . . 26n to a particular level circuit 21A . . . 21N) as well as the previous states of these inputs 25 and outputs 26. Note that the output 26 of a node circuit 77 is not necessarily the same as the input 25 of another node circuit to which it connects. The two can differ when time delays (similar to the delay 68b (FIG. 6A) and described later) are included in the circuitry. Further, the computer 9 is capable of sending signals to the punish/reward bus 76a . . . 76n in FIG. 7A of each level circuit 21A . . . 21N by sending row, column, level and increment or decrement signals 69a . . . 69e as discussed earlier. A general purpose computer made by a variety of manufacturers connected with signal lines to the circuit 101 fills the above roles.

During the learning mode, the computer 9 applies different learning experiences or lessons to the input sensors 10, identifies the outputs 26 of the level circuits 21A . . . 21N and alters the DAC weights 70a . . . 74n (the binary numbers stored in each DAC 70a . . . 74n in FIG. 7A) by sending signals to the punish/reward buses 76a . . . 76n of level circuits 21A . . . 21N.

BOOLEAN FUNCTIONS

In general, the computer 9 "teaches" a level circuit 21A . . . 21N in the following manner. A desired pattern 11 to be learned is applied to the input sensors 10 in FIG. 1 and the outputs 26 are monitored by the computer 9. Reward or punishment of a particular DAC weight 70a . . . 74n is based primarily on "local" rules. These rules have two major aspects: Boolean functions and competition.

Boolean functions are those which rule binary (two state) signals. Each input 25 of a node circuit 77 competes for a Boolean function based upon the action of that input 25 and the action of the node 77 itself. The winners have their DAC 60 weight increased accumulatively: as time goes on, the weights get larger if they continue to win the competition.

Learning usually encompasses many lessons, each having many clock cycles T. A "lesson" is the presentation of a single input pattern 11. The DAC 60 weights can accumulate several ways. One way is for the Boolean function to accumulate over an entire lesson and to modify the DAC 60 weight at lesson's end. A second way is for the Boolean function to compete after each clock cycle and to increment the weight after each clock cycle. The most general case is where the Boolean function accumulates over a period P of several clock cycles, and the weights winning the resulting competition are incremented.

The choice is based on circuit simplicity or computation time. Competing for the Boolean function each clock cycle (the accumulation period P equals T) requires more complex circuitry and more computation time (in digital or software embodiments) than accumulating the Boolean function over a longer period P with simpler analog circuitry. On the other hand, shorter accumulation periods handle time-varying input patterns 11 better than longer ones. Regardless of the accumulation period, the Boolean function, or its effect, accumulates in the winning weights.

In strictly digital implementations, the inputs 25 and the outputs 26 of a node circuit 77 have a binary signal. They are either active (when their respective voter 75 (FIG. 3) fires during the clock pulse) or they are inactive (when their respective voter 75 doesn't fire during that clock pulse).

In analog implementations of the circuit 1 (FIG. 1), the signals 25 and 26 are not binary. For example when the voltage output 26 from a voter 75 passes through an analog delay prior to being input to another node circuit 77, it may have values of voltage other than those representing active and inactive. In such cases the analog voltage is converted to a digital one by use of a threshold—if the analog voltage is greater than a certain threshold the signal is considered active, below the threshold value the signal is considered inactive.

The particular Boolean functions used by the computer 9 for punish/reward signals on bus 76a . . . 76n are based on two-input Boolean operators or gate functions. Sixteen Boolean operators exist which have two inputs; these include the common AND, OR, NAND, NOR, NOT, XOR and IF functions as well as the less common IMP (implication), EQV (equivalence), TAUT (tautology) and CON (contradiction). The two inputs used by these Boolean operators relate the binary output state 26i of a particular circuit 77i with input 25j from another circuit. The relationship between the two output states is either with the present value of the output 26i and input 25j or with the past values. The Boolean function is generally of the form below. The Boolean variable B accumulates over the period P prior to competition for weight modification.

$$B = SUMT[g((FN1(X,Y)),(FN2(X,YT))] \quad (1)$$

where:

X is the binary output 26i of a particular circuit 77i at some particular time t;

Y is the binary input 25j from another circuit to which the circuit 77i is connected, at the time t;

YT is the binary input 25j from the circuit to which the first is connected but at a time previous to t;

FN1, FN2 are functions of the two-input Boolean operators;

g is a functional relationship;

SUMT is a time summation operating over a period P

B is the value of the Boolean function calculated for circuit 77i with respect to input 25j;

COMPETITION

In addition to Boolean functions, punish/reward decisions made by the computer 9 are based on a "competition function." The competition function can be of two forms: competitive or cooperative. First, consider the competitive form of the competition function. A particular node circuit 77 has as inputs 25 the outputs 26 of other circuits 77 to which it is connected. In a purely competitive function, the inputs 25 compete with each other based on their B values: the input 25 with the largest value has its DAC weight increased. Other inputs 25 have their weights reduced or unaltered.

Mathematically, a purely competitive competition function is simply a maximizing function (MAX). After the Boolean functions B for all the inputs 25 to a circuit 77 have been accumulated over period P, the maximum function determines the largest value and rewards the DAC weight 70 associated with that input 25. Reward is accomplished by increasing the value of the binary number stored in the counter 67 of its associated DAC 60. In some embodiments of the self-organizing circuit 1, the maximum function rewards the input 25 with the largest absolute value of B after each period P.

The purely cooperative form of the competition function is opposite to the competitive form. Instead of rewarding only those DAC 60 with the largest B values, all of the DAC 60 weights are rewarded. Between a "purely competitive" function (only the highest value is rewarded) to a "purely cooperative" one (all of the values are rewarded), lie competition functions which vary in the amount of competitiveness and cooperativeness. Competition functions which are "mostly competitive" reward the weights with a few of the highest B values; "mostly cooperative" functions reward many but not all of the weights with highest B values.

In addition to rewarding few or many of the largest Boolean values, the competition function can also involve the punishment of inputs 25 with low B values. Punishment involves decreasing the binary number in counter 67 of the DACs 70 by activating the punish/reward buses 76. For embodiments with positive/negative DACs 70a . . . 73n punishment is based on low absolute B values rather than simply low B values.

To understand the competition function, consider a "mostly competitive" example. Let the input signals at 25a, 25b and 25c of FIG. 7A correspond respectively to a left diagonal, a right diagonal and a horizontal. The signals 25a, 25b and 25c themselves result from the recognition of the various components due to prior teaching of lower level circuits, not shown in FIG. 7A. When the computer 9 applies a pattern corresponding to the letter "A" to the input sensors 10 in FIG. 1 the input signals 25a, 25b and 25c presumably fire because the capital "A" has components corresponding to a left diagonal, a right diagonal and a horizontal.

Initially, the up-down counter 67 in each of the DACs 70a . . . 74n has a zero or small random binary number, thus causing a small or zero current flow from the DACs and produces randomly firing active signals 26a . . . 26n. Let it now be assumed the computer 9 was programmed to allow the output 26a (of the circuit 77a) correspond to the input pattern 11 for the letter "A". In this case the desired result is for an active signal to appear at the connection 26a each time the "A" input pattern is presented. Let the Boolean function B be a simple time summation of the AND function between the inputs 25 and the outputs 26. After a period P (typically several clock cycles) where the input pattern 11 is presented to the circuit 101, the B values will grow larger for those inputs 25 of circuit 77a which fire at the same time as the output 26a, (i.e., those inputs corresponding to the signals 25a, 25b, and 25c whose AND with 26a will always give a positive output). Other inputs 25d . . . 25n will seldom fire in unison with the output 26a and hence their B values will not be as great.

Because of competition, the computer 9 applies a reward signal via bus 76a, which increments the value of the binary numbers in the counters 67 of each DAC 70a . . . 70n which had the highest B values. In this case DACs 70a . . . 70c have a bit added to their respective counter 67 since active input signals occurred on connection 25a . . . 25c. As more and more learning experiences of the letter "A" occurs, the counters of the DACs corresponding to the letter "A" have higher binary numbers and send more current to the voter 75a, causing the voter to fire and giving an output at the connection 26a. On the other hand, the inputs 25a, 25b and 25c may not always be the same during lessons. In the example, some "A"s may not have horizontals; some may have other subcomponents (e.g., the vertical signal at 25n in FIG. 7A). The B values of each input 25 increase when they occur, but most of the correct "A"s contain the signals 25a, 25b, and 25c. Due to competition among the inputs 25 these "not A" inputs are seldom rewarded. The weights of DACs 70a, 70b and 70c are most rewarded, have the highest binary numbers in their respective counters 67, output the most current and therefore have the most influence on the firing of the voter 75a.

Punishment occurs when the inputs 25 do not compete well—when their respective B values are not as high as the most successful inputs such as inputs 25a, 25b and 25c above. The binary numbers in these DACs are reduced to prevent these undesirable inputs from affecting the outcome at connections 26a . . . 26n. For example, if the letter "V" is input to the sensors 10, a lower level circuit identifies the left and right diagonal as input signals 25a and 25b. Assuming that the computer associated output 26b with the pattern for the letter "V", both outputs 26a and 26b may occur. The latter is the "correct" output signal and hence its DACs 71a and 71b have bits added to the binary number in their counters 67. However, the letter "V" is not expected to have a component horizontal, so signal 25c does not fire under letter "V" lessons and DAC 71c does not have a high count in its binary number stored in counter 67.

While the letter "V" output signal 26b results in rewards to DACs 71a and 71b, the computer 9 also punishes other DACs 70a . . . 73n whose signals 26 fired but were not supposed to. The punishment is accomplished by reducing DAC weights which participated in the erroneous signal. For example, in the case where the circuit was learning the pattern 11 of sensor 10 inputs which represent the letter "V", an output signal 26a for the letter "A" may erroneously fire since two of three important sub-components (the left and right diagonal signals 25a and 25b) are feeding current from DACs 70a and 70b into the voter 75a. By reducing the binary number in DACs 70a and 70b, less current flows into the voter 75a and thus an output is less likely to occur at the connection 26a.

As the erroneous output signal 26a occurs during letter "V" lessons it is punished more and more until it gives no further erroneous output at the connection 26a. Essentially, a letter "A" becomes more and more recognized by the horizontal component 25c than does the letter "V": certainly a distinguishing characteristic of an "A" when compared to a "V" is the horizontal. In general, there are many more features (or input signals 25 in FIG. 1) of a letter than just the few mentioned above. Relative positions of components, intersections, lengths of components and so forth are all relevant in distinguishing patterns which represent letters of the alphabet.

COOPERATION

Cooperation is the other form of the competition function. When the circuit 1 learns "associative" information, cooperation improves the speed at which the circuit 1 learns and the accuracy with which it will respond to learned patterns 11. Associative information is that which is associated with the input pattern 11. As in the example above, there are many variations of letter "A"s which can represent the capital letter "A". Of course, a well written "A" would have the three components left slant 25a, right slant 25b and horizontal 25c. However, poorly written "A"s might have a vertical 25n combined with left slant 25a and a horizontal 25c, perhaps a vertical 25n combined with a right slant 25b and a horizontal 25c, or perhaps two left slants 25a and a horizontal 25c. All of these are associated with the letter "A" and all should cause the output 26a to fire if they were presented as pattern 11.

In the first example shown, letter "A" lessons incremented only DACs 25a, 25b and 25c because they had the largest B values over many lessons. Cooperation, on the other hand, rewards many of the inputs 25 which participated in the correct output 26a of a letter "A", not just the largest ones. "Participated" as used here means that input 25 changed state when the output 26a also changed state (discussed in more detail in Change Sensitive Functions). Changed circuits 77 which led to a correct result—the output signal 3 correctly identified the input pattern 11—should cooperate in causing the same outcome again in the future. A cooperative competition function is where many of the changed inputs 25 are altered, not simply the few with the highest B values.

Competitive functions differs from cooperative ones in that competitive competition functions are usually used for distinctions rather than for associations. In the competition example used above, the letter "A" was distinguished from the letter "V". Competitive functions tend to reward only the few changed inputs 25 to a circuit 77 that eventually distinguishes one output 3 from another. By contrast, cooperative functions tend to reward many changed inputs 25 that associate different variations of the same output 3. The self-organizing circuit 1 learns and recognizes patterns 11 better depending on the task being performed: distinction or association. For association tasks, the change in a weight's DAC is usually spread among more of the changed inputs 25 than for distinction tasks.

THRESHOLD LEARNING

The threshold DACs 74a . . . 74n are used to bias the voltage level of the voters 75a . . . 75n (FIG. 7A). Usually, the threshold DACs 74a . . . 74n are "sink" DACs which draw current from the input 30a (FIG. 3) of the voters 75a . . . 75n. For example, in the case where the DACs 70a . . . 73n have only positive binary numbers stored in their respective up-down counters 67 and the supply S is positive, only positive currents will output from the DACs 70a . . . 73n at the respective connections 64c (FIG. 6A). These positive currents fed to the voter input connections 30a in FIG. 3, must be biased by a negative current; otherwise the outputs of every DAC 70a . . . 73n with any binary number in the counters 67 causes the outputs 26a . . . 26n to fire. Clearly, the circuits such as 21 would not function as self-learning circuits if virtually any positive number in counters 67 fired their respective outputs 26a . . . 26n. The bias of threshold DACs 74a . . . 74n are punished and rewarded just as the DACs 70a . . . 73n: by the computer 9 furnishing punish or reward signals on the connections 76a ... 76n. The gates 67c and 67d in FIG. 6A are signaled by the computer 9 in an appropriate manner to allow the value of the binary number in the counters 67 of the threshold DACs 74a ... 74n in FIG. 7A to approximately negate the effects of the sum of positive binary numbers in DACs 70a ... 73n when the correct response to an input pattern 11 to the sensors 10 is obtained at the output connection 26a ... 26n. In general, $$Nt = K * f(SUMJ(Nj))  \qquad (2)$$

where:

Nt: Decimal equivalent of the binary number in threshold DACs 74a ... 74n;

Nj: Decimal equivalent of the binary number in each of the j DACs 70a ... 73n which result in obtaining a correct output at connections 26a ... 26n K: Fractional number;

SUM J: Summation over the j binary numbers; and f: Functional relationship.

For example, in the previous example of teaching a circuit such as the circuit 21 the proper output for an input pattern of the letter "A" input to sensors 10, after, say, one hundred lessons one might expect the binary numbers in the DACs 70a, 70b, and 70c in FIG. 7A to have decimal equivalents of, say, fifty, fifty and eighty, respectively. Assuming no other significant features were required to trigger an output response 26a, the decimal equivalent of the binary number in the DAC 74a might be approximately one hundred fifty.

Since the DAC 74a draws current from the junction 30a (FIG. 3) of voter 75a while DACs 70a ... 70c add current to the junction 30a (FIG. 3), the net current to junction 30a would be proportional to thirty, the difference between the binary number in the DACs 70a ... 70c and the DAC 74a. This current would trigger the voter 75a to give an active output signal 26a. It will be noted, however, that an input pattern representing the letter "V" might only cause the DACs 70a and 70b to output currents proportional to their binary numbers (whose decimal equivalents are fifty and fifty). The net current at the junction 30a (FIG. 3) of the voter 75a is negative; so no output signal 26a results. Thus, for the special case considered here, the threshold DAC 74a helps distinguish between the letter "A" and the letter "V".

POSITIVE/NEGATIVE WEIGHTS

Positive/negative (called simply pos/neg) DACs 70a ... 74n can be used in place of the positive current DACs 60 discussed above as the "weighting" mechanisms for the input signals 25a ... 25n. Pos/neg DACs 70a ... 73n are devices which can output either positive or negative current. One way to implement pos/neg DACs is to modify slightly the circuit shown in FIG. 6A. First, the ladder network of resistors 61 and 62 is changed to have an additional resistor 61a (equal in size to the resistor 61a of the highest order bit) connected directly to a negative supply S. Second, the DAC 60 initially has its up-down counter set with a binary value just equal to half its maximum value (i.e., the highest order bit fires).

The effect is that initially the negative current drained from the transfer gate 64a just equals the positive current added by the up-down counter 67. Once set, any increase of the binary number stored in counter 67 adds current to the voter 75 proportional to the increase (rewarding); any decrease of the number drains current from the voter 75 proportional to the decrease (punishing).

Thus the entire range from current addition to current removal is possible by altering the numbers stored in the pos/neg DACs. In software implementations, the DAC currents are simulated by registers which can store either positive or negative values. A positive current from a particular DAC will tend to fire the associated voter 75; a negative current will tend to inhibit the associated voter 75 from firing. In the discussion which follows, values of the binary number greater than half the maximum are "positive weights"; values less than half are "negative weights". In general, both the path-related DACs 70a ... 73n as well as the threshold DACs 74a ... 74n are pos/neg DACs (see Bias).

Punishment and reward are handled, as before, by the computer 9 which activates the punish or reward buses 76a ... 76n, depending on the competition function of the Boolean function of its input signals 25a ... 25n. Note that DACs are rewarded by increasing the value of the number in their counter 67; punishment is accomplished by reducing the number in their counter 67 thus allowing less current (either positive or negative) to flow. Pos/neg DACs used as DACs 70a ... 73n probably mimic the response of brain neurons more closely than do positive DACs such as the DAC 60 in FIGS. 6A and 6B combined with threshold DACs 74a ... 74n. Both methods are valid methods of producing self-organizing circuits 101. However in the discussion which follows, primarily pos/neg DACs will be used to discuss implementations of various designs of self-organizing circuits.

WEIGHTING METHODS

The external source 9 (FIG. 1) is an external device used to teach the self-organizing circuits 101; it is not used for the circuit's operation. Moreover, in a more advanced self-organizing circuit 101, the teaching function is implemented in internal hardware: the Boolean functions discussed above are made in silicon logic associated with each subcircuit 77a ... 77n.

INTERNAL WEIGHTING

Figure 8A:
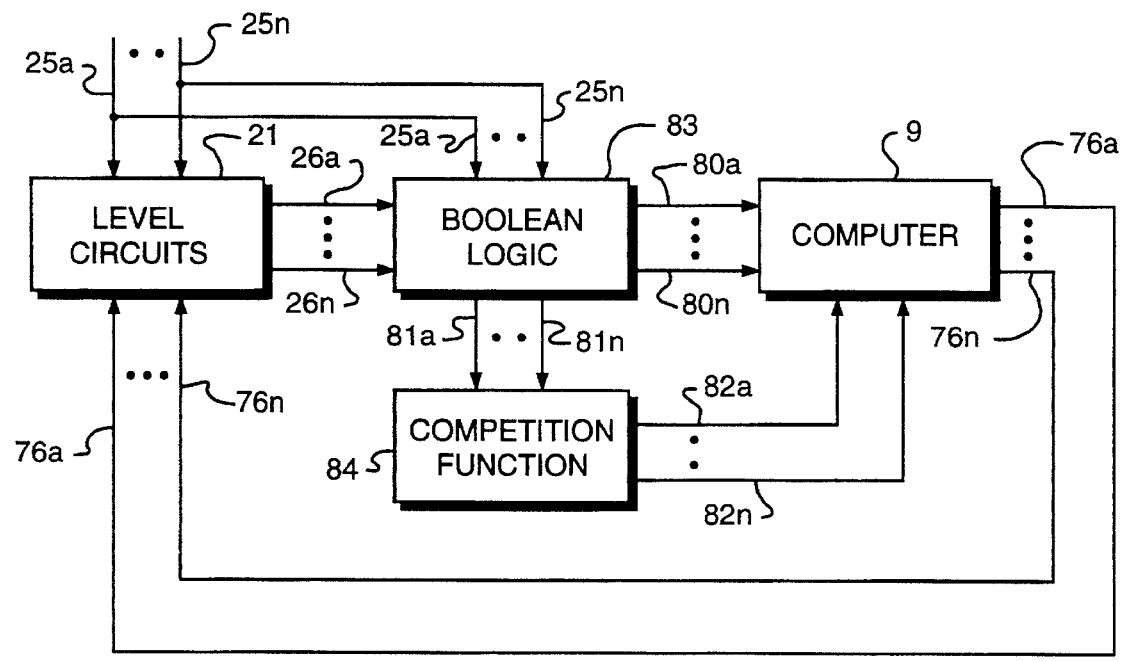
FIG. 8A is a diagrammatic representation of the self-organizing circuit with the Boolean logic function and competition function implemented in hardware.

To understand the various weighting methods between internal or "local" weighting (local implementation of weighting the circuit's DACs 60) and external weighting (where an external source 9 effects the DACs weighting), consider FIG. 8A. The level circuits 21 function, as before, to receive input information in the form of an input signal. The level circuits 21 are operable to effect analysis of the pattern of constituent elements in the input signal to extract the input information from the input signal and provide an output signal related to the input information. The circuits 21, as noted above, are self-organizing circuits or levels 21A ... 21N in FIG. 2 interconnected to receive the outputs 26 of other sub-circuits 77 or levels 21 and to provide other outputs, all of which are connected as inputs to the computer 9 and, usually, fed back from the computer 9, usually after processing by the computer, to other sub-circuits or levels.

Typically, then, a sub-circuit or level of the circuits 21 (e.g., sub-circuit 21A in FIG. 2) receives input signals 25a ... 25n and processes those input signals 25a ... 25n to provide an output signal 26a ... 26n to the other circuits 77 of levels 21A ... 21N. Within each circuit 77 of level 21A ... 21N there is weighting whereby each circuit 77 votes whether or not to pass along information to the other circuits 77. The computer 9 serves to apply modifying inputs to each circuit 77, which modifying inputs serve to correct errors in the output signal 26a ... 26n occasioned by accurate or inaccurate analysis of the input signal 25a ... 25n or the input pattern 11 by the self-organizing circuit 1 in FIG. 1, which consists of the preprocessor 20 and the sub-circuits or levels 21A ... 21N.

The Boolean logic function and the competition function of the circuits 77 of the level circuits 21A ... 21N are now discussed in detail. Note, however, that the operation of the weighting of the DACs 60 are also influenced by the universal punish/reward signals; as a simplification, only their weighting due to other outputs 26 and inputs 25 will be discussed.

According to the present teaching, the outputs 26a ... 26n of the various level circuits 21A ... 21N are connected as input to Boolean logic function circuits 83 which may be separate circuits as shown or may be functions within the computer 9. Output 80a ... 80n in FIG. 8A from the Boolean logic function circuits 83 to the computer 9 provide some of the data to permit the computer 9 to provide modifying inputs to the circuits 21A ... 21N. That is, one mechanism by which the circuits 21A ... 21N are self-organized is by feedback from the Boolean logic function circuits 83.

As noted earlier, the results of the Boolean logic computation (by the circuits 83 or by the computer 9) are further modified by competition or cooperation amongst the various inputs based on the B score accumulated over the period P. In FIG. 8A, the competition function is executed by competition function circuits 84, which receive inputs 81a ... 81n from the Boolean logic function circuit 83 and provide inputs 82a ... 82n to the computer 9 which processes these inputs to provide modifying inputs, included or part of the inputs 76a ... 76n in FIG. 8A, to the level circuits 21. The purpose of the competition function circuits 84 is to provide modifying inputs to the level circuits 21 in FIG. 8A based upon competition or cooperation among the messages received by the various circuits 77 of levels 21A ... 21N from the other circuits 77.

LOCAL WEIGHTING

Figure 8B:
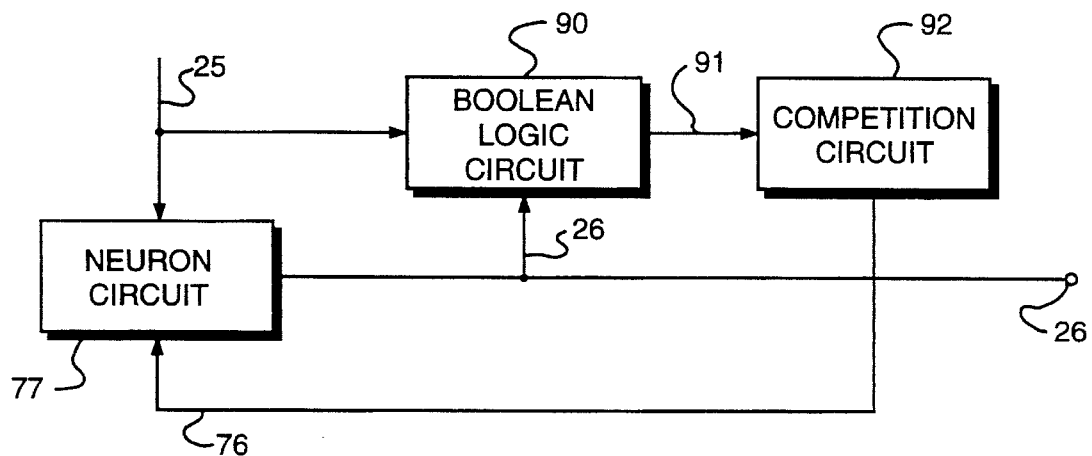
FIG. 8B shows how the same hardware logic functions are implemented at the subcircuit level of the self-organizing circuit.

FIG. 8B shows the Boolean logic function and the competition function implemented on the local level without requiring the use of external source 9. As discussed earlier, the node circuit 77 (one of the circuits 77a ... 77n shown in FIG. 7A), receives inputs 25 (collectively, the inputs 25a ... 25n in FIG. 7A) and has an output 26 (one of the outputs 26a ... 26n in FIG. 7A). In addition, each node circuit 77 has an associated Boolean logic function circuit 90 which performs the Boolean logic operation described earlier to determine the B scores of the inputs 25 based on the Boolean values of the inputs 25 and the output 26 accumulated by the node circuit itself.

The output of the Boolean logic function circuit 90 is input via connections 91 to the competition function circuit 92 which rank orders the B scores of the inputs (or the largest absolute B scores in some circuits). Depending on whether the competition function is competitive or cooperative, fewer or more of the rank-ordered functions will be chosen for modification. The circuit 92 applies a modifying input to the node circuit 77 via bus 76 to alter the DAC weights 70.

Thus the weights in the self-organizing circuit 1 can be modified by several alternate methods. They may be externally modified by a teaching computer 9 with Boolean logic and competition functions implemented in software programming. In the method shown in FIG. 8A the weights can be modified by an external computer 9 which bases its decision on internal Boolean logic circuits 83 and internal competition circuits 84. The weights can also be modified completely internally using Boolean logic circuits 90 and competition circuits 92 associated with each node subcircuit 77. A designer skilled in the field can devise many other weighting methods which have various amounts of internal and external functions which accomplish the Boolean logic and competition functions of this invention.

FLOW CHART

In FIG. 1 the preferred use of the computer 9 rather than some other external source (for example, a human operator) is one of convenience only. Teaching with some other external source is identical to teaching with a computer 9, though perhaps slower. The innovation of the present invention lies in the structure of the self-organizing circuits 77 and the method by which the circuit organizes itself, not in the use of a computer 9 or internal circuitry which are merely convenient and speedy means of teaching the self-organizing circuit.

Figure 7B:
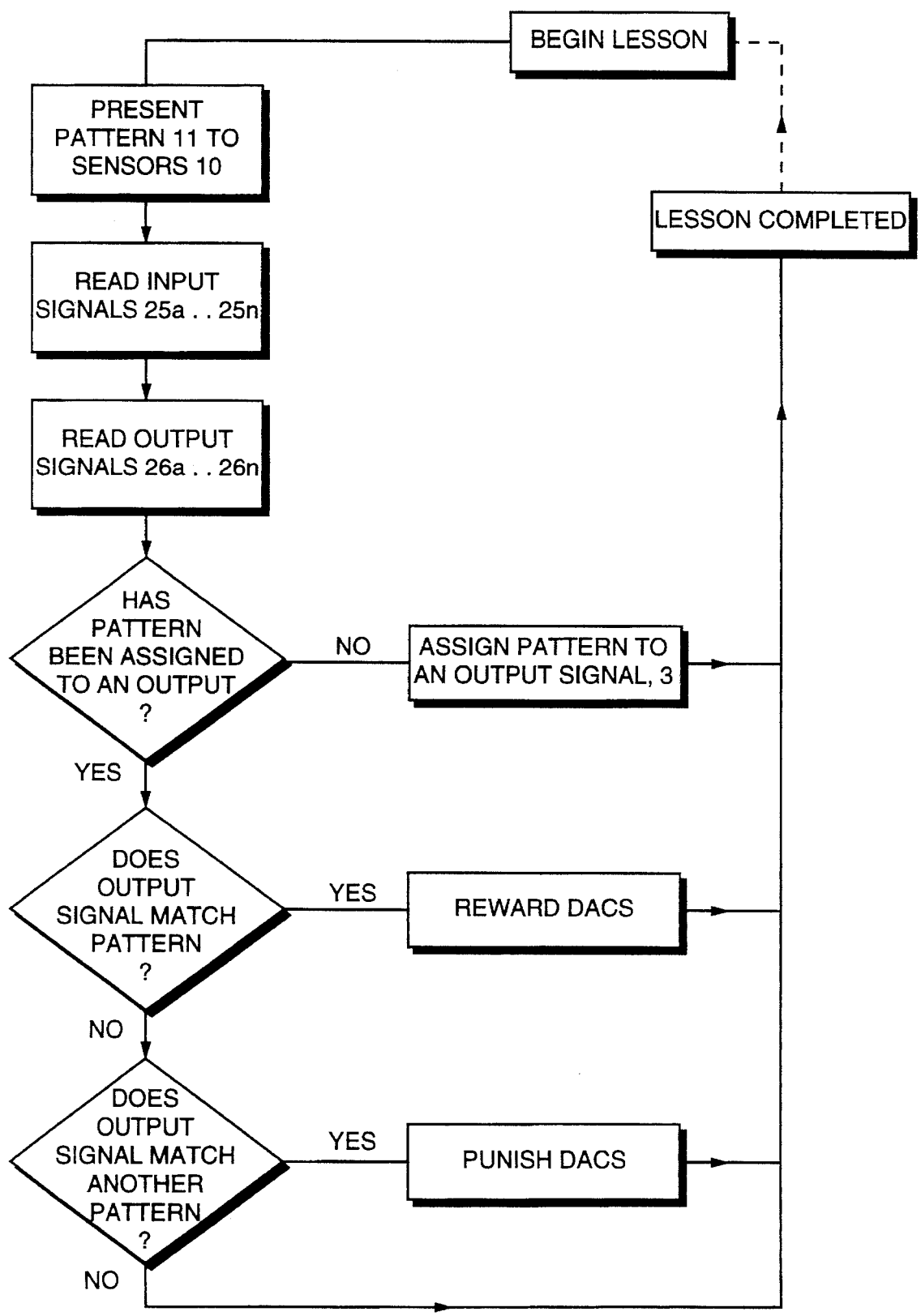
FIG. 7B is a flow chart for the computer of FIG. 1.

The operation sequence of the computer 9 or some other external source can be summarized by the flow chart shown in FIG. 7B. FIG. 7B indicates that the first task of the computer 9 or other external source is to present patterns 11 to be recognized to the sensors 10. For example, a human operator may write a pattern 11 representing the letter "A" such that an optical system associated with the sensors 10 causes digital variation in the sensor outputs as discussed earlier. Next, the active input signals 25a ... 25n and output signals 26a ... 26n of level circuits 21A ... 21N are read as indicated by the second and third blocks of the flow chart. The next operation in a "lesson" is to assign or associate an active output signal 26a ... 26n (of either the final level circuit 21N or an intermediate one) with the particular pattern 11 to be learned, if this has not already been done in a previous lesson.

The final two operations concern reward and punishment. If the output signal 26a ... 26n of the desired level matches the assigned pattern, the DACs 60 are rewarded by increasing the absolute value of the binary number stored in their counters 67 (for illustration, pos/neg DACs 70a ... 73n are assumed). If the output signal 26a ... 26n does not match the assigned pattern 11, the DACs 60 are punished by reducing the absolute value of the binary numbers stored in their counters 67. At either of these decision points the lesson is completed by altering the binary number stored in the counters 67 of the appropriate DACs by triggering either the reward or punish buses 76a ... 76n. The reward or punishment criteria is based on the Boolean functions of Eqn. 1. While a lesson for a static pattern 11 can last as long as a single clock cycle T, preferred embodiments have several clock cycles associated with each lesson (see Burst Functions).

The reward/punishment procedure shown in FIG. 7B is not the only procedure useful in connection with the self-organizing circuit 21, but represents one of several possible procedures, as will be discussed shortly; other procedures represent simple changes in the method of altering counters 67 of DACs 60 while still others represent slight variations in the circuits as well.

For example, a circuit self-organizing such as the circuit 21 may have its counters 67 altered in the following manner: each output 26a ... 26n which fired increases the binary numbers in those DACs 70a ... 73n which already contain positive binary numbers but reduces the binary numbers in those DACs 70a . . . 73n which already contain negative binary numbers. This learning strategy is useful in stabilizing a particular pattern 11 to a particular output 26a . . . 26n after initial inhibitory or excitory characteristics (minus or plus currents) have been established through punish and reward signals 76a . . . 76n. In this case, only the method for altering binary numbers is changed, not the circuit itself.

Another way in which the learning strategy is changed is by altering the circuit itself. Although often the same effect can be accomplished by modifying the rule for altering binary numbers, both methods are valid for teaching self-organizing circuits.

DIRECT FEEDBACK

Certain self-organizing circuits may require outputs 26a . . . 26n to feed directly back to inputs 25a . . . 25n. One common use of such feedback signals is to provide an output 26 whose firing rate, averaged over many clock cycles, varies. While the output of a circuit 77 is binary, a binary output is not useful in situations where the output signal 26 is to drive actuation circuits whose output 26 must vary proportionately to the amounts of time spent on various input patterns 11. Since actuation circuits (e.g., electrical motors driving the controlled object 14, FIG. 1) typically have inertial effects which integrate their input over time, output signals 26 whose pulse rate varies are often useful in self-organizing circuits 1.

When the net current input to a voter 75 of a node circuit 77 is only slightly greater than zero it fires, producing an output signal 26. If this output 26 feeds directly back to the circuit 77 as an inhibitory input 25, the tendency will be prevent the circuit 77 from firing a second time or third time in succession because the inhibitory feedback signal drains current from the voter 75. For a very large weight associated with the feedback input 25, the output 26 of the circuit 77 might fire only once and then be inhibited from firing for the next ten clock cycles.

However, when the net current flowing to the voter 75 (from inputs 25 other than the inhibitory feedback current) is much greater than zero, the feedback from the output 26 has relatively little effect on the behavior of the circuit 77. The inhibitory feedback signal doesn't drain enough current from the voter 75 to prevent the output 26 from firing every time. For a very large weight associated with the DAC 60 of the feedback input 25, the circuit 77 might be inhibited from firing some portion of the clock cycles.

Here then is a method by which the firing rate of a circuit 77 is varied. For a given feedback weight, the frequency of firing is low when the net current is low, but as the net current increases, the firing rate increases. The effect is proportional to the value of the feedback weight (the number stored in DAC 60 of the input 25 coming directly from the output 26). When the feedback weight is low, there is little effect on the circuit's firing rate; when the feedback weight is high, the effect is greater. The feedback weight stored in DAC 60 is a proportionality constant between a circuit's net current and its firing rate.

The proportionality between net current and firing rate is also altered by the delay 68b (FIG. 6A) of DAC 60 of the feedback input 25. When the delay is small, the inhibitory feedback acts immediately to inhibit the output 26 from firing; when the delay is large, the current drawn from the net current otherwise flowing to the voter 75 is delayed. The weight stored in DAC 60 combined with the delay 68b of that DAC 60 produce a time constant which controls how the firing rate is proportional to the net current.

In some embodiments of the circuit 77, direct feedback is accomplished by circuit modifications of the voter 75 itself. In these circuits, the output signal 26 is first inverted and then fed directly to the input of the voter 75 through a fixed resistor-capacitor link. The inversion assures that current is drained from the circuit 77 each time it fires. Based upon the fixed values of the resistor-capacitor combination, more or less current is drained on each firing of the node circuit 77. The effect is the same as using a DAC 60 except that the proportionality constant between net current to voter 75 and firing rate is fixed, not variable.

NEGATION

Besides feeding output signals 26 as inputs 25 to the same circuit 77, they are also fed back to other circuits 77 in the same level 21 as well as to other levels 21. These feedback signals aid in distinguishing between various patterns. For example, an output signal specifying the capital letter "A" may be required in recognizing the capital letter "V": although an "A" pattern has some of the components of the "V" pattern, the pattern cannot simultaneously be both. Thus a characteristic of the "A" pattern is that it is not "V"; a characteristic of the "V" pattern is that it is not "A".

If the output signal 3 representing pattern "A" is signal 26a, when that signal is used as an inhibitory input signal 25 of the circuit 21N, it has a negative weighting effect in the case where, say, pos/neg DACs 60 are used to provide the current inputs to voters 75a . . . 75n. As learning progresses, each correct pattern "A" which was recognized acts to inhibit the pattern "V" output 3 from occurring since the computer 9 punishes the input signal (i.e., adds negative binary numbers to the counter 67 associated with the appropriate DAC 70a . . . 73n) if the output signal 3 for pattern "V" occurs simultaneously with that for pattern "A".

Alternatively, the computer 9 may in some self-organizing circuits such as circuit 21 punish all DACs 60 for the ones (e.g., 70a . . . 70n) which the computer 9 had identified with the pattern "A" output signal 3. The effect is the same-one and only one of the signals 26a . . . 26n of the level 21N tends to fire during any particular recognition cycle.

In still other self-organizing circuits 1 the input signals 25a . . . 25n themselves may be required to be negated. For example, in recognizing the pattern for the letter "O", an important criterion may be the absence of any straight lines such as diagonals, horizontals, or verticals. Thus an active signal representing "not vertical" or "not horizontal" may be as useful in recognition tasks as the signals representing "vertical" or "horizontal".

NON-FIRING NODES

Circuits 77 are binary: they either fire or they do not fire. In actual neurons which cause muscle contraction, it is the firing neurons which carry the information. However, in many sensory neurons, information is carried by both firing and non-firing neurons. Similarly, node circuits 77 can carry information to other circuits 77 even if they are non-firing.

For example, consider three circuits 77. The output 26 of the first circuit 77A feeds an input 25 of the second circuit 77B through a DAC 60 whose negative weight draws current from the second circuit 77B just large enough to prevent the circuit 77B from firing. The output 26 of the second circuit 77B, when firing, feeds an input 25 of the third circuit 77C through a DAC 60 whose negative weight drains just enough current to prevent the third circuit 77C from firing. The second and third circuits 77B and 77C are NOT functions: if the circuit 77A driving them changes state, then they respond oppositely.

When the first circuit 77A fires, it inhibits the second circuit 77B from firing. However, the third circuit 77C fires because without the negative current drained by the second (only firing inputs 25 actuate the gate 64a of DAC 60, FIG. 6A), its voter circuit 75 receives enough current to fire. Now suppose the first circuit 77A stops firing. This first circuit no longer produces the inhibiting effect on the second circuit 77B and the second begins to fire. The second circuit 77B, on firing, drains current from the third circuit 77C which then ceases to fire. Information is conveyed down the chain of circuits even though they were non-firing. When the second circuit 77B changed from non-firing to firing, it caused the third circuit 77C to change as well. Similarly when the first circuit 77A changed from firing to non-firing, it caused the third circuit 77C to change (through the interaction with the second circuit 77B).

Circuits 77 carry information to other circuits 77 and other levels 21 primarily by changing state. The change can be from firing to non-firing or from non-firing to firing. Hence, non-firing circuits 77 are as important to the operation of self-organizing circuit 1 as are firing circuits 77. Patterns of firing and non-firing circuits 77 of the network 1 determine how the input signals 2 produce the output signals 3. In analogous organic self-organizing circuits, these patterns are called thoughts.

UNIVERSAL SIGNALS

Universal signals are those which are directed to all the DACs 70a...74n of the circuits 21A...21N. These signals change the Boolean functions B of the DACs so that reward and punishment (incrementing and decrementing the binary numbers in the counters 67 of the DACs) can be influenced by the external source 9 teaching the self-organizing circuit 1. As the name implies, the universal signals 5 an 6, FIG. 1 are sent universally to all circuits 77. Universal signals are a way to aid the external source 9 in identifying correctness and relationships in the input patterns 11 taught to the circuit 1.

CORRECT AND INCORRECT

One form of universal signals is based on the correctness of the outputs 3. In this way, pattern recognition which occurs at the highest level of circuit 1 can be used to influence the learning process at lower levels. For example, let it be supposed that the pos/neg DAC method is used in the level one circuit 21A of FIG. 2 for recognition of letter components such as left diagonal, right diagonal, horizontal and so forth. Let it be supposed, too, that in a level two self-organizing circuit 21B, the same method is used to recognize patterns of letters based on the outputs of the level one circuit 21A. In the learning of patterns 11 by the first circuit 21A, punish or reward signals 76a...76n alter the binary numbers in DACs 60 as earlier described in order to identify output signals 26a...26n associated with component patterns of diagonals, horizontals and so forth. However, in some self-organizing circuits 1 (FIG. 1), learning of component patterns 11 by the first circuit 21A may also occur simultaneously with learning of patterns of letters by the second level circuit 21B.

To accomplish this function in electronic circuitry or simulation software the "correct" or "incorrect" signals 5a and 6a can be transmitted simultaneously to all DACs 70a...73n, in addition to separate punish-reward signals based on Boolean functions. Signals 5a and 6a are two of several universal signals 5 and 6 which communicate universal signals to all DACs 60 of levels 21A...21N. Each DAC 60 combines the "universal" correct/incorrect signals 5a and 6a from the computer 9 with the output signals 26a...26n to alter the binary number stored in the respective counter 67 of the DAC 70a...73n. In one simple method of accomplishing the combining, an AND combination (both inputs present to get a signal) of the correct/incorrect signals 5a and 6a and the output signals 26a...26n are used to either reward or punish the binary numbers.

In operation, a correctly recognized pattern 11 (as presented to the sensors 10 by the computer 9) causes the computer to transmit a "correct" signal 5a to the self-organizing circuit 1. The "correct" signal 5a combined with a changed output signal 26a...26n (i.e., the output 26 changes from firing to non-firing or from non-firing to firing) in an AND combination adds binary numbers to the counters 67 in the DACs 70a...73n; the "incorrect" signal 6a combined with a changed output signal 26a...26n in an AND combination subtracts binary numbers from the counters 67.

In the present example, learning of "letter" patterns 11 by circuit 21B is accompanied by correct/incorrect signals 5a and 6a depending on whether the learning was correct or incorrect. Since these same punish and reward signals are also transmitted to the circuit 21A, learning will occur on this circuit as well: binary numbers will be altered in response to correct or incorrect answers. Hence, a "diagonal" component signal on first circuit 21A is rewarded if it helped to cause a correct letter "A" pattern to be recognized by the circuit 21B. In this sense "helped to cause" means that it changed state when both the input pattern 11 and its correctly associated output 26 (or output 3 of circuit 1) also changed state. In general, any DAC in the circuit 1 which contributes to a correct answer is rewarded; a DAC that contributes to a wrong answer is punished.

ASSOCIATION AND DISTINCTION

Universal signals 5 and 6, such as the one described above, improve self-organizing of circuit 1. Other universal signals 5b and 6b convey to the circuit 1, in a universal manner, important information about the input patterns 11.

As discussed earlier (see Competition and Cooperation), the self-organizing circuit 1 can be used for two separate tasks: association and distinction. A new pattern 11 (as characterized by inputs 2 to the circuit 1) falls into either of two categories. It is either like a previously learned pattern 11 or it is different from any previously learned pattern 11. If the new pattern 11 is the same as a previous pattern, the task of the circuit 1 is to associate the new pattern with the previous pattern which it is alike. If the new pattern 11 is different from previous patterns, the task of circuit 1 is to create a new output 3 which responds to that input pattern 11. This is distinction.

Universal signals 5b and 6b can be used to signal the circuits 77 of circuit 1 that association or distinction is taking place. Signal 5b represents "association" rather than "correct"; signal 6b represents "distinction" rather than "incorrect". However, signals 5b and 6b are universal: they are sent to all circuits 77 of circuit 1, which, together with the Boolean function B, are used to change the binary number stored in DACs 70a ... 74n of level circuits 21.

Essentially the signals 5b and 6b modify the Boolean function B as will be discussed shortly (see Stabilizing and Destabilizing). The external source 9 presents the pattern 11 to the sensors 10 in conjunction with either the universal signal 5b or 6b. For example, if the circuit 1 had previously learned the capital letter "A" pattern and the new pattern was the small letter "a", signal 5b would be actuated to associate the two patterns 11 by modifying the B value for all the circuits 77 which changed when the pattern 11 changed. However, if the new pattern was the capital letter "V", signal 6b would be actuated to distinguish between the two patterns: B values of the changed circuits 77 are modified in a different way than for association to eventually produce a new output signal 3. Note that the best associations and distinctions of pattern 11 can be made by alternating back and forth between the two patterns 11 that are to be associated ("A" and "a" in the example) or the two that are to be distinguished ("A" and "V" in the example above).

In addition to modifying the amount by which the weights in the DACs 60 of circuits 77 are altered, the association signal 5b and the distinction signal 6b can be used to alter the number of DACs 60 of a circuit 77 which changed state when the pattern 11 was input. For distinction, only one or a few of the DACs 60 with the highest B values have their weights modified (competition). For association, many of the DACs associated with changed inputs 25 have their weights modified (cooperation).

NAMING AND INTERMEDIATE OUTPUTS

Preferred embodiments of self-organizing circuits 1 eliminate the need for learning experiences by a lower level circuit (e.g., level circuit 21A used in the previous example). The circuits 21A ... 21N form a network of circuits 77 which change state to produce the firing and non-firing patterns which convert a particular input pattern 11 to a correct output 3. While naming the inputs 25 as components of letters as in FIG. 7A aids in understanding the workings of circuits 77, generally no such intermediate components are known or required.

The issue is concerned with "naming": associating a particular output 26a ... 26n of some level circuit 21 with a named or known pattern 11. For the circuits 77 discussed so far, all outputs 26a ... 26n are known or identified prior to learning. Output 26a, for example, is associated with the pattern 11 for a left diagonal, output 26b for a right diagonal and so forth. These outputs are "named," they are associated with a pattern that we, the reader, knows already.

Naming, while useful for illustration, is not needed for the self-organizing operation of circuit 1. For instance, a circuit 1 whose task was to optically read handwriting would be very concerned which letter patterns 11 were associated with which letters, although the outputs 26a ... 26n associated with the components such as left diagonals, verticals or horizontals would have other components which we, the reader, might not recognize at all. For these situations, naming can occur randomly or, more general still, no intermediate components need be named at all.

In random naming, the counters 67 of pos/neg DACs 70a ... 73n (FIG. 7A) are initially loaded with small, but random, increases or decreases prior to learning. Instead of the binary number in counter 67 exactly balancing the current drain, small variations in the binary number leave small variations in the currents added or drained from the voter 75. During initial lessons, all outputs either fire or don't fire based solely on the sign (positive or negative) of the summation of random numbers stored in their DACs 60. Reward and punishment signals are based, as before, on the Boolean functions of the inputs 25a ... 25n and outputs 26a ... 26n of each level circuit 21A ... 21N. As learning progresses, some output signal 26a ... 26n tend to become associated with an intermediate component. Exactly which one is not important since these intermediate outputs 26a ... 26n are transmitted to the next higher level circuit.

For example, if the level one circuit 21A is to have outputs 26a ... 26n which represented components such as diagonals, horizontals and so forth of letters whose outputs 26a ... 26n are in the level two circuit 21B, the DACs 70a ... 70n of the first circuit 21A would be loaded with small random increases or decreases. Input signals 25a ... 25n of the first circuit 21A come from sensors 10 but are preprocessed by preprocessor circuit 20. These inputs 25a ... 25n activate certain columns of the DACs 70a ... 73n in FIG. 7A, for instance, the first three columns of DACs. Some of DACs 70a ... 73n, based on the random numbers in their counters 67, would output enough current to the voters 75a ... 75n to cause the voters to fire.

The computer 9 sends reward and punish signals based on the Boolean functions to the DACs 70a ... 70n in levels 21A ... 21N, incrementing or decrementing the number in their counters 67. If the signal were incorrect, the numbers in counters 67 would be decremented. In particular, the DACs 70a ... 73n in the first circuit 21A would be incremented or decremented. As more and more lessons occurred for various block letter patterns 11, certain intermediate components would become associated with particular outputs 26a ... 26n of the level one circuit 21A. However, which outputs become associated with which intermediate component patterns 11 would not be known, a priori. Hence, an output 26a might become associated with a diagonal, with a horizontal or with some other component pattern 11 purely at random; "naming" is not necessary.

In the more general case as shown in FIG. 2, many level circuits 21 are involved in the determination of the output 3 using input patterns 11. While some of the circuits 77 might have outputs 26 which actually represent a component which we, the reader, might recognize, most circuit 77 outputs are important only in that they interact with other circuits 77 to produce the correct recognition of the pattern 11 at the output 3 of the level circuit 21N.

BALANCE AND ADDENDUM

As has been discussed previously, the influence which an input connection 25 has on its voter 75 is determined by the value of the binary number stored in its associated DAC 60 (one of the DACs 70a ... 73n). The "weight" of the DAC 60 is itself determined by a combination of influences: the Boolean function of the particular input 25 and the output 26 of the voter 75 to which it connects; how well that Boolean function competes or cooperates with that of the other DACs 70a ... 73n connected to the same voter and modification of the Boolean function by universal punish/reward signals 5 and 6. In addition to these, yet another influence on the weights of DACs 70a ... 73n leads to better self-organizing properties of the circuit.

"Balance" is a term which applies to the balance of the inhibitory and excitory inputs applied to a voter 75 of a node circuit 77. When too many of the DAC 60 weights of a circuit 77 are either inhibitory (draining current from voter 75) or excitory (adding current to voter 75), the circuit 77 cannot change state easily, producing poor self-organizing capabilities. Balance is achieved by incrementing DAC 60 weights in such a way that neither inhibitory nor excitory weights dominate. Without balance, a node circuit 77 may become dominated by either inhibitory or excitory influences. More importantly, a balanced node 77 is capable of taking on more information as will be discussed shortly (see Addendum).

Balancing can be accomplished in two basic ways: balancing the positive and negative weights of all DACs 60 connected to a voter 77 or balancing the positive and negative weights of only those DACs 60 connected to an input 25 which is firing. With either of these methods, an out-of balance node 77 is pushed toward a more balanced state by either changing its bias weight (in DAC 74s) or its branch-related weights (in DACs 70a . . . 73n).

WEIGHT BALANCE

"Weight balance" is balancing a node circuit 77 by assuring that all the DAC 60 weights connected to it are neither too inhibitory nor too excitory. The balancing is done regardless of whether the input 25 to that DAC 60 is firing.

One way to weight balance a node 77 is to use the "net balance" on the node to modify the competition for Boolean function of each node circuit 77. The net balance of a circuit 77 is computed by the computer 9 by summing the binary numbers for all pos/neg DACs 60 connected to a circuit 77 (including the threshold DAC 74). The net balance is positive if this sum is positive, else it is negative.

The net balance can be used to influence the competition function for the largest B values and thus keep the node balanced. If the net balance on the node circuit 77 is positive, the competition is slanted so that negative weights (binary numbers in pos/neg DACs 60 which are less than half WMAX) will compete more easily. As the weights of each sign grow larger, those that are negative will tend to grow faster than the positive because they will be rewarded with a weight gain more often. Conversely if the net balance is negative, then positive weights in DACs 60 will do better in the competition, and the tendency will be to increase positive weights to the detriment of negative weights. Again node balance is maintained.

A second way in which weight balance can be maintained on a node circuit 77 is to base the weight change of DACs 60 with a positive weight on the sum of negative weights and the weight change of DACs 60 with a negative weight on the sum of positive weights. The positive and negative sums are the same as are described above. Such a method appears to be used by neurons in the cortex of living organisms: inhibitory neurotransmitters spur the growth of excitory connection strengths while excitory neurotransmitters spur the growth of inhibitory connection strengths.

FIRING BALANCE

"Firing balance" is similar to weight balance except that the balance is based only on those DAC 60 weights whose associated input 25 is firing. Since only those inputs 25 which are firing produce a positive or negative current at the voter 75, it is these DAC weights 60 which most influence whether the node 77 will be dominated by excitory or inhibitory influences. Note that the threshold DACs 74 are included in the firing balance since they also produce a current at the voter 75.

One way to achieve firing balance is to reward DACs 60 of each sign equally during the competition or cooperation for Boolean functions. Assuming a Boolean function, B, which is largest for firing inputs 25, competition or cooperation takes place in each node circuit 77 for the largest B values among the DACs 60 associated with firing inputs 25 to which it is connected. Firing balance is achieved by allowing the excitory (positive weight) DACs 60 to compete separately for the biggest positive B values, while the inhibitory (negative weight) DACs 60 compete for the biggest negative B values.

The DACs 60 with the biggest B values of each sign (positive or negative) are rewarded with weight increases: positive weights get more positive and negative weights get more negative. As the circuits 77 of the self-organizing circuit 1 learn the input pattern 11, the biggest of both the positive and the negative weights are increased more or less equally so that any particular circuit 77 stays close to being firing balanced.

Firing balance can also be achieved by basing the DAC 60 weight changes on how close the circuit 77 is to firing or to not firing. When a node circuit 77 fires, it is because the net current to its voter 75 is positive. When it does not fire, it is because the net current to its voter 75 is negative. Using pos/neg DACs, the current injected into the voter 75 depends on whether the inputs 25 to the circuit 77 fired, on the value and sign of the weights stored in its input DACs 60, and the value of its threshold DAC 74. All these influence the net current to the voter 75 and thus whether the circuit 77 fires.

"Fill" is the term used to represent the net current to a voter 75 because it measures how "full" is a node circuit 77. If Fill is greater than zero, the node will fire; if it is less than zero it won't fire. Note, however, that a noise current might prevent the voter 75 from firing despite its Fill being greater than zero (see Uncertainty). Fill is the weighted sum of the input weights for each input that fired, plus the bias (the threshold weight 74). Fill also represents how close a node circuit 77 is to achieving a firing balance: how close is it to changing state. Large values of Fill (either positive or negative) mean the node is far from changing state—that either excitory or inhibitory influences dominate the node 77. Low absolute values of Fill mean the node 77 is close to changing state, that the node is nearly balanced.

BALANCE AND LEARNING

Learning, the modification of the DAC 60 weights in circuits 77, can be thought of as being composed of two parts: competition or cooperation for Boolean functions to determine which DACs 60 will be altered, and incrementing or decrementing DAC counters 67 by an appropriate amount. In both parts, weight balance and/or firing balance can be used to improve self-organization.

In the Boolean competition function, net balance or Fill is used to modify the Boolean function B discussed earlier. First, define net balance (NBAL) and Fill (FILL) in terms of the DAC 60 weights of the circuit 77:

$$NBAL = SUMJ(Nj) + Nt \quad (3)$$

$$FILL = SUMJ(Nj * IF(Yj)) + Nt \quad (4)$$

where, as before:

Y is the binary input 25j from another circuit 77j

IF is a Boolean operator

Nj is the decimal equivalent, either positive or negative, of the binary number in the DAC 60 associated with the input 25j SUMJ is the summation over the j inputs Nt is the decimal equivalent of the binary number stored in the threshold DAC 74 of the circuit 77

Note that since Fill determines the state of node 77, Fill is the Boolean function IF(X). These balance expressions are used to modify the Boolean function B as follows:

$$BM = f[B, NBAL, FILL, U, Nr] \quad (5)$$

where:

B is the Boolean function associated with a DAC 70a . . . 73n accumulated over a period P NBAL is the net balance (Eqn. 3)

FILL is proportional to the net current to voter 75 (Eqn. 4)

U is the Universal signal

Nr is a random number used to add noise to the competition f is a functional relationship BM is the Modified Boolean function The BM values are used in the same way that B values are used to pick a few or many of the DACs 60 having the largest BM values. Universal signals 5 and 6 can modify the BM values for the task at hand to improve self-organization. For instance, if the task is an associative one, the signal 5b modifies BM to reward many of the DACs 60 with a high BM value (a cooperative competition function). Conversely, for distinction tasks, the signal 6b modifies BM to reward only a few DACs having the highest BM values (a competitive competition function). The noise number Nr adds an uncertainty to the competition much as the noise current adds uncertainty to the node's firing.

STABILIZING AND DESTABILIZING

After identifying which DACs are to be rewarded, the second part of learning is to modify the numbers in the counters 67 of those DACs 60. The amount that the DAC 60 weights are modified depends on the same variables as the competition: the Boolean function B, the net balance and/or Fill and the universal signals 5 and 6.

Modifying the DAC 60 weights has the effect on the node circuit 77 of stabilizing or destabilizing it. As an illustration, consider the preferred embodiment where weights are modified based on the Fill of the circuit 77. In addition, let the universal signals 5 and 6 represent stabilizing or destabilizing. Stabilizing is usually related to either reward tasks (signal 5a signaling the circuit 1 that the output 3 is correct) or association tasks (signal 5b signaling that the new pattern is associated with a previously learned pattern). Destabilizing is usually linked to either punish tasks (signal 6a denoting that the output 3 is incorrect) or distinction tasks (signal 6b indicating that the new pattern is distinct from a previously learned one).

To stabilize a node circuit 77 is to drive its Fill away from zero (either positively or negatively). To destabilize a node is to drive its Fill toward zero and eventually change state. Put another way, stabilizing tends to prevent a node circuit 77 from changing state; destabilizing tends to cause a node circuit 77 to change state.

Below is a simple weight modification strategy which can be implemented in either hardware circuitry or software simulation. The inputs 25j which have the highest Boolean function are chosen as the ones whose weights will be modified. Then they are modified according to Eqn. 6.

Notice that only firing inputs contribute to the weight modifications:

$$X = SGN \text{ (FILL)}$$

$$Wj = ((T0-1)*WjOLD + U*WMAX*X)/T0 \quad \text{For Yj fires}$$

$$Wj = WjOLD \quad \text{Otherwise} \quad (6)$$

where:

FILL is the net current to node 77 (+1 for firing and −1 for not firing)

SGN is the Sign operator

X is the state of node 77

U is the Universal signal: +1 for stabilizing and −1 for destabilizing

WMAX is the maximum possible weight (either sign)

WjOLD is the old value of the weight (the weight at the previous time step)

T0 is the time constant

Wj is the weight from input 25j to node 77

Yj is the state of the input 25j

Now consider stabilizing node circuit 77. If the node 77 is firing, then its Fill will be positive (except for the noise current, Fill is the variable which determines whether the node fires or not), and X will be positive (+1). For stabilizing, U is also positive (+1). According to Eqn. 6, the new weight is driven toward a maximum value (WMAX) whose sign matches its Fill. That is, a firing node 77 (with positive Fill) drives toward positive WMAX while a non-firing node (with negative Fill) drives toward negative WMAX. As the weight changes, so does the binary Nj in the DAC's counter 67. If it's a firing node, the counter's number gets more positive, adding positive current to its voter 75 (and its Fill). Stabilizing a firing node makes it more likely to fire. If it's a non-firing node, its weight is driven toward −WMAX; as the weight gets more negative, its effect is to make the node's Fill even more negative and less likely to fire.

For destabilizing, the opposite is true. The universal signal U for destabilizing is negative (−1). If the node 77 is firing (X=+1), its weight is driven negatively, draining current from an already firing node 77. On the other hand, a non-firing node 77 (with a negative Fill and X=−1) has its weight driven positively. Either way, the Fill value of the node is closer to zero after the weight modification than before. Eventually, repeated weight modifications change the node's Fill value enough to change state—from firing to non-firing or from non-firing to firing.

Because of either self inhibition (see Direct Feedback) or noise currents (see Uncertainty), the Fill of a node circuit 77 does not completely determine X, its outcome 26, but rather the tendency of its outcome. For instance, if the node had been firing consistently and was destabilized (as above), the effect of noise currents or of self-inhibiting feedback currents might simply make the node fire less consistently. As we will see, the proper choice of a Boolean function assure that only consistently firing or consistently non-firing node circuits 77 dominate the self-organizing capability of the circuit 1.

More complex weight modification strategies than Eqn. 6 provide a way to be sure that a node circuit 77 will stay changed once it has changed state. For example, when the weight modification is based on Boolean functions, B, which use previous values of node firings (see Burst Filters), a node can change state rather than simply reverting to an inconsistently firing node. Moreover, some weight modifications strategies specifically target nodes with low Fill values by making the weight modification proportional to the reciprocal of Fill. Thus nodes 77 with low Fill values have their branch weights (numbers stored in DACs 60) changed faster than stable consistent nodes (having high Fill values).

Node circuits 77 are stabilized or destabilized by another method: modifications of the threshold DAC 74. Since Fill is a summation of all additions and drains of current to its voter 75, the threshold DAC 74 also affects stability. The method is similar to DAC 60 weights linked to the inputs (i.e., DACs $70a \ldots 73n$). For stabilizing, firing node circuits 77 have positive increments added to the threshold DAC 74 and non-firing nodes have negative increments added. For destabilizing, firing nodes have negative increments added and non-firing nodes have positive increments added to their threshold DACs 74.

WEIGHT LIMITING

In stabilizing and destabilizing, the weights in DACs 60 are modified according to a weight modification stategy such as Eqn. 6. This particular strategy has limits imposed upon the maximum value which any weight can have: the weights are driven to either −WMAX or +WMAX. The weights are usually limited in the hardware case by the physical constraints or the circuitry. For example, in DACs 60 with a fixed supply voltage S, the maximum amount of weight change is determined by the number of bits in its up-down counter 67 or the number of transfer gates 63 in its ladder network.

Fill, the firing balance of a node, can also be used to limit the weight values in DACs 60. Weight limiting based on Fill assures the Fill does not get so large that it can prevent a node from changing. Consider the case when several inputs 25 fire, each having a high positive weight. Fill, the net current to the voter 75, would become very high as each input contributed a positive current (even if the threshold current from DAC 74 offset the total). During certain operations of the circuit 1 (see Tunneling and Densifying), a very large Fill prevents the network of node circuits 77 from proper learning of new patterns 11.

Using Fill as the criteria for limiting DAC 60 weights simply means that when the Fill exceeds a limit (either positively or negatively), no further weight changes are made. Learning, the modification of DAC 60 weights, only takes place when the Fill is within the Fill limits. Different input patterns 11 produce different combinations of inputs 25 to a particular node 77. As weights to the node build, connections with other inputs 25 strengthen. However, no additional weights are added if the Fill exceeds its limits. Alternatively, the weights can approach the Fill limits asymptotically by reducing the weight increase as the Fill approaches its limits.

DIRECTED NETWORKS

The network in FIG. 2 shows a network where each level circuit 21 is connected to those from a lower level: level 21A outputs 26 are the inputs 25 to level 21B; level 21B outputs 26 are the inputs 25 to level 21C and so forth. As discussed previously, a net of node circuits 77 composing a level circuit 21 has, in addition, connections from outputs 26 at higher levels to inputs 25 at lower levels, as well as connections from outputs 26 at one level to inputs 25 at the same level.

For more efficient self-organizing, "directed networks" are a preferred embodiment. A directed network has connections to its node circuits 77 which direct the outputs 26 of the net in a preferred direction. For example, the network circuit 1 in FIG. 2 is a directed network: information tends to flow from left to right in the diagram. A change of state at the leftmost level circuit 21A tends to propagate to 21B and then to 21C and on to 21N— a rightward direction— because, as shown, most of the inputs 25 to circuits 77 come from a lower level which produce changes in the next higher level.

Conversely, if the net were dominated by feedback connections from higher levels to lower levels, then the preferred direction of the network would be from right to left. In such a network, the inputs 25 of a node circuit 77 in level circuit 21k would come primarily from a higher level circuit 21 (k+1). Changes in the output signals 3 of level 21N tend to propagate from right to left: output signals 3 are the outputs 26 of node circuits 77 of level 21N which are directed to level circuit 21(N−1) as inputs 25. Similarly, the outputs 26 of level 21 (N−1) become inputs 25 to node circuits 77 of level 21 (N−2) and so forth until the change eventually propagates to the first level circuit 21A. Changes (information) proceed from right to left—from 21N to 21A rather than from 21A to 21N.

An easy way to understand network direction is to consider a node circuit 77. Since the network's information tends to propagate from inputs 25 to outputs 26, the net direction is opposite to the direction from which most of the inputs 25 are from. If a circuit 1 has node circuits 77 whose inputs 25 come primarily from lower levels then the network direction is toward the right; if the inputs 25 come primarily from higher levels then the network is directed toward the left. In organic networks of neurons, the preferred direction is in the direction of the neuron's axon.

For more efficient self-organizing, a circuit 1 can be thought of as having two preferred directions overlaid on each other. One network is similar to that shown in FIG. 2 with a preferred direction from input signals 2 to output signals 3. The other network has an opposite preferred direction: from output signals 3 toward input signals 2. The two networks are connected to each other at every level by cross connections: outputs 26 of node circuits 77 in one network are inputs 25 to the circuits 77 of the oppositely directed network and vice versa.

Note that the concept of two oppositely directed networks is one of convenience only. The resulting network is no different than a single network of circuits 77 in levels 21 that have some of its node circuits 77 directed toward the outputs 3 (directed left to right in FIG. 2) and some which are directed toward the inputs 2 (directed right to left in FIG. 2). Each node circuit 77 has inputs 25 from other node circuits 77 which are both left and right directed. Neurons in the cortex region of the brain have a similar structure.

The purpose of the two oppositely directed networks of node circuits 77 is to assure that changes in state of the outputs 26 of the circuits 77 are propagated both from inputs 2 toward outputs 3 as well as from outputs 3 toward inputs 2. Note that a random mix of nodes having some circuits 77 directed from input 2 to output 3 and some directed from outputs 3 to inputs 2 accomplishes a similar self-organization efficiency.

Net direction is most important in stabilizing (e.g., distinction tasks) rather than in destabilizing. When nodes are destabilized, their direction of propagation is important in providing a path between changed inputs 2 and changed outputs 3. For stabilizing, net direction is not as important. For example, in association tasks, changed nodes 77 should ideally stabilize any surrounding changed node regardless of its direction. Indeed, in one embodiment of circuit 1 stabilizing and destabilizing have different preferred net directions: stabilizing has no preferred direction at all while destabilizing has two overlapping nets, one with a preferred direction from inputs 2 to outputs 3 and the other from outputs 3 to inputs 2.

Different tasks can have different net directions by using the computer 9 to decide which group of node circuits 77 should compete for the modified Boolean function, BM. Consider a node circuit 77 which is on the Kth level. If surrounding changed nodes are to be stabilized (as expressed, say, by universal signal U), then the inputs 25 to circuit 77 whose weights are modified are chosen by computer 9 from adjacent nodes on the K−1 level, the Kth level and the K+1 level: no net direction. If the surrounding changed nodes are to be destabilized, inputs 25 are chosen from the set of levels which produce the net's direction: from levels K, K−1 and K−2 for a right-directed net, from levels K, K+1, K+2 for a left-directed net.

The weights are modified in the usual manner based on the appropriate competition function such that inputs 25 from the chosen levels will influence the state of circuit 77 in the future. Unchosen inputs 25 have DAC 60 values which are unmodified, have no change in their contributions to voter 75 current and consequently have no additional effect on the state of circuit 77.

ADDENDUM

"Addendum" is an important feature of a self-organizing system that is to operate on a variety of information at different times. Addendum is the ability of a circuit 1 to add information in addition to that on which it has already been trained. For example, suppose a pattern of input signals 2 (FIG. 1) representing the letter "A" was taught to the circuit 1 (as was previously described by presenting this input pattern 11 to appropriate sensors 10 and preprocessor circuit 20). The circuit would then be able to recognize the letter "A" if the input pattern 11 presented to the sensors 10 once again was an "A" or close to it.

If the circuit was trained on the letter "V" at the same time, the input pattern 11 could be either a letter "A" or a letter "V" and the output signals 3 would respond either to the letter "A" or to the letter "V" as previously described. "At the same time . . ." here means that the patterns for the letter "A" and the letter "V" are presented to the circuit 1 alternately—first the letter "A" pattern, then the letter "V" pattern, back to the letter "A", then "V" again and so forth. By using such a presentation of patterns, the weights (the values of the binary numbers in the DACs 70a . . . 74n) incorporate the information of both patterns 11 at the same time.

However in living organisms, the learning of one pattern is not restricted to occur simultaneously with the learning of all other patterns. All living organisms have the ability to add new patterns—new information—to the store of patterns which they learned at a previous time. For the most part, living organisms learn patterns sequentially in a one-after-the-other manner, rather than learning patterns simultaneously. As described earlier, the connections (inputs 25) of a node circuit 77 are chosen by having them compete or cooperate for the Boolean function modified by the universal punish/reward signal. If highly competitive, only a few of the many inputs to a circuit 77 develop large inhibitory or excitory connection weights. If highly cooperative, many of the inputs 25 have their weights modified. Although the method applies equally well for the cooperative case, as a simplification consider only the highly competitive situation.

As the same pattern 11 is repeatedly presented to the sensors 10, the winning connections grow larger and larger (either positively if connected to a positive source or negatively if the reverse). After many of these weight modification steps, only a few of the connections will dominate the response of the node. Addendum operates by freezing or maintaining the weights of the winning connections of the previously learned patterns, during the time when a new pattern is being learned.

To understand how addendum operates, consider a hypothetical node circuit 77d which has pos/neg DACs and inputs 25 representing primitives of letters. After the circuit 1 has been trained on the letters "N", "R", and "V" many times, circuit 77d modifies its weights so that certain inputs tend to dominate its behavior. Strong excitory weights come from inputs 25a and 25b (similar to those in FIG. 7A) representing a left diagonal "\" and a right diagonal "/", respectively. Strong inhibitory weights come from inputs 25d and 25n representing a left-facing curve ")" and a vertical "|", respectively. Other inputs 25 have lost in the competition for BM values—their DACs only have small binary numbers; they contribute little to whether voter 75d fires or not.

When the input pattern 11 presented to the circuit 1 is a "V", the voter 75d tends to fire. Two of its subcomponents (" \" and "/") are present; DACs 60 connected to these two inputs 25 inject large amounts of current into the voter 75d causing it to fire and producing an output signal at 26. When the patterns 11 for "N" and "R" are presented, they tend to prevent the voter 75d from firing. Though these patterns have a subcomponent in common (the \) which adds current to voter 75d, they also have strong inhibitory signals from inputs 25d and/or 25n which drain current. Hence the voter 75d tends to fire when patterns for the letter "V" are presented but not fire when patterns for "N" and "R" are presented. Other circuits 77 are trained in a similar way to respond only to the "N" and "R" patterns.

But now suppose the circuit 1 is to learn additional information—while still retaining the information it already has. Suppose a new input pattern 11 representing the letter "A" is to be learned in addition to patterns for the letters "N", "R" and "V" to which it already responds. First the winning connections of the node circuits 77d are held fixed; the binary numbers in those DACs 70a . . . 74n which developed the highest binary numbers during previous learning experiences (i.e., DACs of inputs 25a, 25b, 25d and 25n) are no longer allowed to participate in the competition for highest B values. The binary numbers in the DACs associated with these inputs are held fixed. In living organisms, neuron connections appear to undergo a similar process which distinguishes "short-term memory" from "long-term memory." In long-term memory, protein synthesis in the synapses (connection points between neurons) occurs, making connections which last for years.

As the new pattern 11 representing the letter "A" is presented to the sensors 10, once again the inputs 25 to circuit 77d operate through their respective DACs 60 to add or drain current from the voter 75d causing the circuit to either fire or not fire. Since the pattern "A" has both left and right diagonals, the circuit 77d (whose output 26 represents the letter "V") tends to fire due to its excitory connections 25a and 25b. Note that while these fixed weights do not change, they still influence the voter to which they are attached when their respective inputs 25 fire.

In addition to circuit 77d firing, the circuit 77e whose output 26e eventually will represent the letter "A" also fires. The DAC 60 having output 26e as an input 25e to the voter 75d—a feedback connection from output to input on the same level circuit—will develop a high B value since the computer 9 will reward the "correct" response "A" rather than the incorrect response "V" (see Universal Signals). The DAC 60 connected to input 25e (and output 26d) will compete well with the other DACs and is likely to be rewarded by increasing its weight. Since it is an inhibitory connection, it drains current from the voter 75e.

After presentation of the pattern representing "A", the negative weight associated with input 25e will be increased. In addition, other DACs 60 of circuit 77d will likely be rewarded (for example, the input representing "NOT horizontal"). Notice, however, that the connections associated with inputs 25a, 25b, 25d and 25n (which already have large binary numbers in their DACs) do not participate in the competition for B values. Only the "losing connections" from previous learning experiences participate in the B value competition. As the pattern 11 representing "A" is presented again and again, the binary number stored in the DAC 60 connected to input 25e of circuit 77d will grow larger and larger. Soon input 25e along with inputs 25a, 25b (positive) and 25d, 25n (negative) will dominate the behavior of the voter 77.

The result is that information has been added to the circuit 1 by showing it only the new pattern 11 representing the letter "A". The learning of the new pattern occurred after other patterns had been learned, not in conjunction with the learning of the other patterns. In particular, the node circuit 77d which responds to the input pattern "V" by firing, learned not to fire when the pattern "A" is presented—despite both patterns sharing two important subcomponents.

BALANCE AND ADDENDUM FUNCTIONS

The balance and addendum functions, like the Boolean logic and competition function described earlier, is how the network of node circuits 77 learn patterns 11 presented via sensors 10 and preprocessing circuit 20. These functions only determine how the weights (the numbers stored in DACs 60) are modified during self-organizing operation of the circuit 1.

As such, the functions can be implemented completely by the external computer 9, as discussed with respect to the Boolean logic and competition function. The computer 9 serves to apply modifying inputs to each sub-circuit or level in the level circuits 21 in FIG. 2, which modifying inputs serve to correct errors in the output signals 26a . . . 26n of the level circuits 21 (or output signals 3 in FIG. 1) occasioned by accurate or inaccurate analysis of the input signals 25a . . . 25n of the level circuits 21 (or input signals 2 in FIG. 1). As noted previously, the use of the teaching computer 9 is merely one of convenience; a human operator could also modify the inputs (i.e., change the values of the numbers stored in the DACs) to the level circuits 21 in FIG. 2, so long as the rules described for balance and addendum were used to insure efficient self organizing.

Just as Boolean logic and competition functions can be implemented in internal circuitry (FIG. 8A), so can the balance and addendum functions. Instead of calculating the modified Boolean functions BM and weight changes Wj by the external computer 9, they are calculated internally based on Boolean function, universal signals and balance variables (Fill or net balance). Addendum functions are implemented internally by freezing the values of the appropriate DACs 60 when they have grown large enough. The circuitry is a variation of that shown in FIG. 8A.

The balance and addendum functions can be implemented locally. In this case each node circuit 77 has its own circuitry which determines the modified Boolean function and freezes the weights of the appropriate DACs 60 of that circuit 77. The circuitry is a variation of that shown in FIG. 8B which determine the Boolean function and the competition function of each node circuit 77.

Lastly, in a software simulation of the circuit 101, the balance and addendum functions can be implemented as software algorithms on a general purpose computer which also simulates the action of DACs 60 and voters 75.

CHANGE SENSITIVE AND BURST FUNCTIONS

An important function of a self-organizing system is to be sensitive to change. Knowing when and where an input pattern 11 changes allows a self-organizing circuit 1 to organize more efficiently. Changes—either to static or time-varying patterns—which occur at any of the inputs 25 to any of the level circuits 21 can be used to modify the connection weights DAC 60 between the inputs 25 and the outputs 26 of a node circuit 77. The sensitivity to change can be accomplished in two ways: 1) the competition criterion can be modified to be sensitive to change and 2) the subcircuits themselves can be modified to be sensitive to change.

CHANGE-SENSITIVE WEIGHTING

The competition criterion for modifying the connection weights is based on a Boolean function between the output 26 of a voter circuit 77 and its input 25 (including past values of the input 25). The Boolean function can be chosen such that its accumulation will allow it to compete well toward increasing its connection strength.

Consider a distinction task where two patterns are to be distinguished from each other: distinguishing the letter "A" from the letter "V". Distinction tasks typically have competitive competition functions where only a few of the highest B values are rewarded by weight increases (see Association and Distinction). Using the format of FIG. 7A, the input 25c specifying the horizontal is the one which changes. The other two inputs 25a and 25b remain the same for either letter "A" or letter "V" input as pattern 11; they do not change and should fare less well in the competition for weight increases of their DACs 60.

To understand the process, use the simple change-sensitive Boolean function:

$$B = SUMT[K1*AND(X,Y) + K2*ABS(IF(Y) - IF(YT))] \qquad (7)$$

The first term, K1 *AND(X,Y), is the one discussed previously for Boolean function (see Competition Example). The second term K2*ABS(IF(Y)–IF(YT)) is the change-sensitive term. K1 and K2 are constants which control the relative amount of change sensitivity. The time summation is over the period P, here taken to be one lesson.

Applying this simple function to the example of distinguishing a letter "A" from a letter "V", assume that letters "A" and "V" are input alternatively as the input pattern 11. When you distinguish two patterns that differ slightly, you use the same strategy: first you look at one and then back to the other, again and again. The first term (the Boolean AND(X,Y)) accumulates for DACs 70a and 70b when the inputs "\" 25a or "/" 25b fire at the same time that output 26a (the "A"); it accumulates for DACs 71a and 71b when the output 26b (the "V") fires. The second term contributes nothing for these DACs—when either the "A" or the "V" are presented these inputs do not change.

However, the situation is different for the input 25c. For DAC 70c, the first term contributes to B whenever pattern "A" is presented. The second term also contributes to the B each time the input pattern changes from an "A" to a "V" (or back again): IF(Y) is unity whenever the horizontal appears in the input pattern 11, and IF(YT) is unity at some previous time. Hence whenever the patterns change, the value of IF(Y) differs from that of IF(YT) and the second term adds to the accumulation of Boolean function. In a digital implementation, the "previous time" is typically one or more clock cycles; the patterns 11 are typically presented for many clock cycles.

IF(Y) and IF(YT) differ only when the pattern changes. As the patterns 11 switch back and forth between "A" and "V", the input 25c (and its corresponding DAC 70c) will compete well with other inputs which don't change. The result is that connection strength of input 25c is likely to be increased—the horizontal is an important component in distinguishing an "A" from a "V". Note that other components such as the left and right slants (inputs 25a and 25b) are also likely to have their connection strengths increased by competing well. Their Boolean function B is based more on the first term than the second since they do not change.

CHANGE-SENSITIVE CIRCUITS

Figure 9:
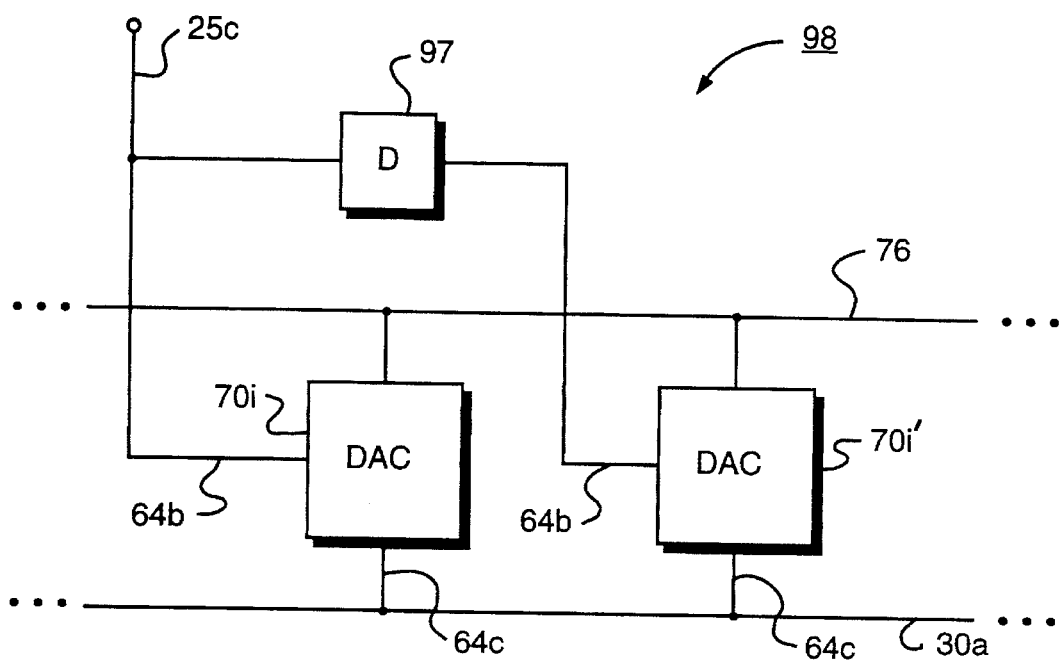
FIG. 9 is a diagrammatic representation of a modification of the circuit in FIG. 7A showing how change-sensitivity can be implemented.

Not only does the choice of Boolean function make a self-organizing circuit 1 more change sensitive, but so do changes in its circuitry. FIG. 9 shows a modification of a portion of the circuit shown in FIG. 7A. This circuit 98 is presented only to illustrate how the circuit 7A can be made change-sensitive with only minor changes; in general, the components are combined to make a much simpler circuit than presented here. Two DACs 70i and 70i' are connected to the same input signal 25i via connections 64b (see FIG. 6A). They add or drain current via connections 64c into the same connection 30a which is an input to a voting circuit 32. Both DACs, in the simplest implementation, are also both connected by the same punish/reward bus 76 such that both increase their connection strength (the binary numbers in their counters 67) by the same amount.

The two DACs 70i and 70i' differ in that they have opposite signs of their voltage sources (see source S, FIG. 6A). If one DAC has a positive source, then the other has a negative source. They also differ by the addition of a delay 97 through which the input signal 25i passes before going to DAC 70i'. The delay is identical to the internal delay 68b of the DAC; it is called out specifically to emphasize its importance to the operation of the circuit. In a digital implementation of the circuit 1, the delay 97 is typically one or more clock cycles; in analog circuits, the delay's time constant is longer than the time constant of the voter 32 (FIG. 3). The internal delay 68b of the DAC 70i will be much less than that of the delay 97 for proper functioning of the circuit.

Again assume that the patterns 11 are the letters "A" and "V" alternately presented to circuit 1. Consider a circuit 98 whose input is the horizontal signal 25c (FIG. 7A)—it only fires when the letter "A" is presented. Let the DAC 70i have a positive voltage source (it adds current to the associated voter 32) and the DAC 70i' have a negative voltage source (it drains current from the voter). Suppose that the letter "V" had just been presented and the pattern 11 was then switched to the letter "A". When the signal 25c first fires, DAC 70i adds current to the connection 30a while the DAC 70i' has no effect— its input is delayed by delay 97. The net tendency is to make the voter 32 more likely to fire. A short time later when the delay of time delay 97 has passed, the current added by DAC 70i is the same as that drained by DAC 70i' (since they both have the same binary numbers in their counters 67). There is no net current added to the connection 32a by the input 25c, so input 25c has no influence on the firing of voter 32.

Let the Boolean function be the simple function AND(X, Y) as discussed previously. For several clock cycles after the pattern 11 changes from "V" to "A", DACs 70i and 70i' of input 25c will accumulate the Boolean function, B. It will accumulate again when the pattern switches back. After many presentations, the DACs of input 25c compete well with the other connections and are likely to have their connection strength increased. Certainly a distinguishing feature of the letter "A" is not only that the horizontal is present, but that its first appearance is important. Moreover, when the letter "A" is removed, the change-sensitive circuit 98 prevents the "A" output from firing. When the horizontal input 25c ceases, current is drained from the voter when DAC 70i' stays on even after DAC 70i stops adding current.

Note that change sensitive circuits such as shown in FIG. 9 are added to circuit 7A in addition to DACs such as 70a ... 73n. Hence an input 25c would likely feed into a DAC 70c as shown in FIG. 7A and also feed into a circuit 98 sensitive to changes in the signal 25c. Also note that because a circuit 98 is sensitive to change, it is also sensitive to noise. A random firing of the input 25i would cause noisy fluctuations in the voter connection 30a. Usually the delay 97 is several clock cycles to prevent the circuit from being too noise sensitive.

The change sensitive circuit 98 is one of many such circuits. The important characteristic of a change sensitive circuit is that an input signal 25i arrives at a voter via two paths, one which drains current and one which adds current. If one signal is delayed from the other, the circuit becomes change sensitive. Indeed, multi-level circuits (such as those described on p. 22 of U.S. Pat. No. 4,479,241 by the present inventor) spontaneously form change-sensitive paths through subcircuits when delays such as delay 68b are included. Similarly, when both the signal and its negation (for example, "horizontal" and "not horizontal") having different internal delays 68b are both input to the same voter circuit as previously discussed, conditions are ripe for spontaneously forming change-sensitive circuits. The methods now discussed for making change-sensitive circuits by either proper choice of the Boolean function which accumulates or by circuit modification improves the sensitivity to respond to changes in the input patterns, either static or time-varying.

BURST FILTERS

In the change sensitive circuits described above, time delays 68b in the DAC 60 (FIG. 6A and 6B), were used to sensitize the self-organizing circuit 1 to changes of the signals relayed between its node circuits 77. The delays 68b can also perform another important function of self-organizing circuits: burst filters. Burst filters assure random or short cyclical firings (or non-firings) of surrounding nodes 77 do not cause learning (changing the weights of DACs 60). Learning should only be caused by relatively consistent firings (or non-firings) of surrounding circuits 77.

Burst filters are also needed in the recognizing mode where inconsistent inputs 25 from surrounding nodes 77 are prevented from causing changes in circuit 77. The delay filter 52 (FIG. 5C) is often sufficient at preventing node circuits 77 from firing due to random inputs 25: random firings of an input 25 are attenuated by its associated delay filter 52. Only consistently firing inputs 25 (those which fire many times in a row) can penetrate the delay filter 52. Note, however, that the simple first order filter 52 cannot always prevent randomly firing inputs 25 from triggering circuits 77.

Hence, burst filters 300 (FIG. 10) are valuable in two different applications in self-organizing circuits 1. First, they are used in the learning mode, where they prevent weight changes between inconsistently firing circuits 77. Second, they are used in the recognition mode to better attenuate randomly firing circuits 77. Burst filters require bursts of firings from a node 77 before signals are acted on—either by the learning (weight modification) circuits or by other circuits 77 during the recognition mode. In either application, the filter may be implemented as either analog circuitry or as digital algorithms, depending on whether the learning mode and the recognition mode have been implemented in hardware or software. The preferred embodiment is for the learning (modifying the binary number stored in DAC counters 67) to be implemented by a computer such as external source 9, while the recognition (determining the state of outputs 26) to be implemented in hardware. However, a person skilled in the art could envision alternative embodiments.

An analog burst filter is simply a higher order filter 52 (FIG. 5E) than the simple first order filter shown in FIG. 5C. Burst filters belong to a class of filters called low-pass filters: they pass lower frequency information but attenuate higher frequency information. Filters with a sharp cutoff between the low frequencies passed and the high frequencies attenuated are the preferred embodiment of burst filters. In the discussion which follows, burst filters are used to reduce the effects of inconsistently firing nodes 77. Inconsistent firing means those firing randomly due to noise currents (see Uncertainty), those which are non-firing but which occasionally fire, as well as those with short cyclical cycles (periods typically less than 10 T).

Figure 10:
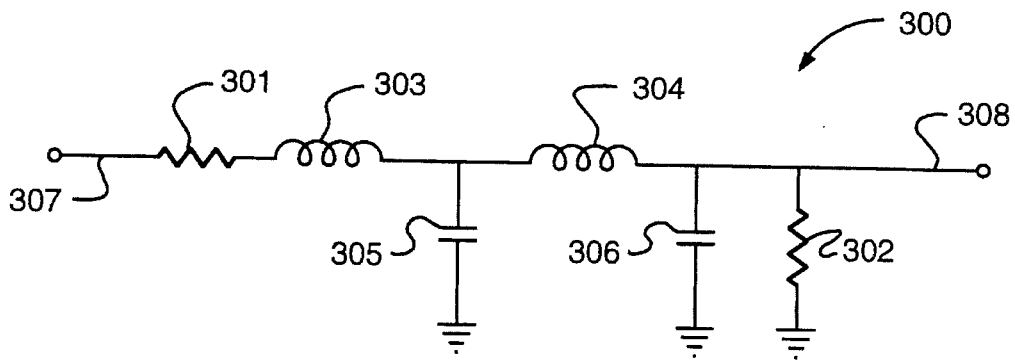
FIG. 10 is a diagrammatic representation of a filter used in conjunction with the circuit of FIG. 7A whose shorthand symbol is also shown.
Figure 10:
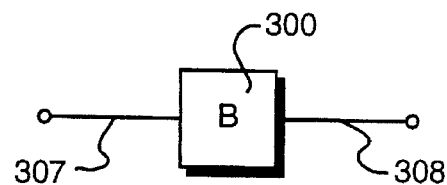

Shown in FIG. 10 is a passive low-pass filter 300 with sharp cutoff; resistors 301, 302 inductors 303, 304 and capacitors 305, 306 are sized to allow a few pulses from a firing circuit to be attenuated, while a burst of many firings in succession passes through the filter. A burst filter may also be produced using active elements such as op-amps. FIG. 10 also shows the shorthand symbol for the burst filter 300 with connection 307 as input and connection 308 as output. Note that dendritic spines of biological neurons are thought to serve as burst filters in living organisms.

Burst filters 300 used in the recognition mode replace the simple first order filter 52 (FIG. 5C) in the generalized delay 68b (FIG. 6A) of the DAC 60 (FIG. 6B). When used in a DAC 60 of a node 77, the inputs 25 are burst filtered before they affect the outcome of the voting circuit 75. Only bursts of firings at the inputs 25 allow the output 26 of circuit 77 to change.

To prevent randomly firing input 25 from influencing the learning mode of circuit 77, burst filters 300 incorporated into the DACs 60 also assure that the Boolean logic circuitry 83 and 90 (FIG. 8A and 8B) only respond to bursts of firing or non-firing inputs 25i. Alternatively, burst filters 300 can be added to the Boolean logic circuits 83 and 90 so that accumulations of the Boolean function are based on consistent firings and not random ones.

Burst filters can be added in software as well as in hardware for those embodiments where the DACs 60 are rewarded or punished by a computer rather than by specialized circuitry as in FIG. 8A and 8B. Burst filter algorithms (see Discrete Time Systems, Ch. 2,3, *Control and Dynamic Systems*, Takahashi, Auslander and Rabins, Addison-Wesley, Reading, Mass., 1970) are generally of the form:

$$ZT = PZ + Q\ IF(y) \quad (8)$$

$$B = SUMT[Z] \quad (9)$$

where:

Z are the values of an 1×N discrete-time state vector at various discrete time steps k; one of the states is chosen to be the output B (or BM)

ZT are the values of the same state vector one time step later than k

P is an N×N dimension state matrix with matrix values chosen to pass primarily frequencies of Y below a certain value Q is an 1×N input vector Y is the Boolean input at time steps k where IF(Y)=1 if Y fires and IF(Y)=0 if it doesn't fire N is the order of the state system and determines how sharply higher frequencies are rejected SUMT is the time summation over the period P B (or BM) is the (modified) Boolean function When burst filters are implemented as a learning algorithm, the input Y to the burst filter is the boolean signal from an input 25. One of the states of the vector Z is chosen to be either the B value (Boolean function) or the BM value (modified Boolean function) discussed earlier.

COMBINED FILTERS

Preferred embodiments of the Boolean function combine burst filters with change sensitive functions (see Change Sensitive Functions). Below is a combined filter which combines an N=4 burst filter shown in Eqn. 8 with a change sensitive function similar to Eqn. 7. It operates as a bandpass digital filter: it is insensitive to very quick changes and also to very slow changes, but it is sensitive to changes of intermediate duration. The filter here is implemented in digital hardware but could also be implemented as software in a digital signal processing (DSP) circuit or a generalized computer.

$$Z1 = (((T1-1)*Z1T) + IF(Y))/T1$$

$$Z2(((T1-1)*Z2T) + Z1)/T1$$

$$Z3 = (((T1-1)*Z3T) + Z2)/T1$$

$$Z4 = (((T2-1)*Z4T) + Z3)/T2$$

$$B = SUMT[ABS(Z3-Z4) - Bt]\ IF\ ABS(Z3-Z4) > Bt$$

$$B = 0\ IF\ ABS(Z3-Z4) < Bt \quad (10)$$

where:

Y is the binary input 25j of a circuit to which circuit 77 is connected, at time t Z1,Z2,Z3,Z4 are the filtered values of Y having time constant T1 and T2

Z1T,Z2T,Z3T,Z4T are the values of Z1,Z2,Z3,Z4 at a previous time step

Bt is threshold value which ABS(Z3–Z4) must exceed for the input 25j to compete

SUMT is a time summation over the period P

B is the Boolean function

In this combined filter, an order 4 (N=4, Eqn. 8) state vector Z1, Z2, Z3 and Z4 operates on the input IF(Y). The states are combined to give a burst filtered, change-sensitive B value in which only those values of B which exceed the threshold Bt compete at all. Typically the threshold value (Bt) is 50% or more of the maximum B resulting from a step change to an input 25. The absolute value function assures that input Y can change from either firing to non-firing or from non-firing to firing with the same result.

The B function identifies those inputs 25 which change and stay changed for several T1 time constants. Randomly changing inputs and cyclically changing inputs (with bandwidth greater than 1/T1 where T1 is typically 5 to 10 time steps T) all receive low B values and do not compete effectively (see Uncertainty and Direct Feedback). In addition, inputs which do not change for a very long time (T2 is generally 20 T or longer) also have low B scores and do not compete effectively.

Figure 11:
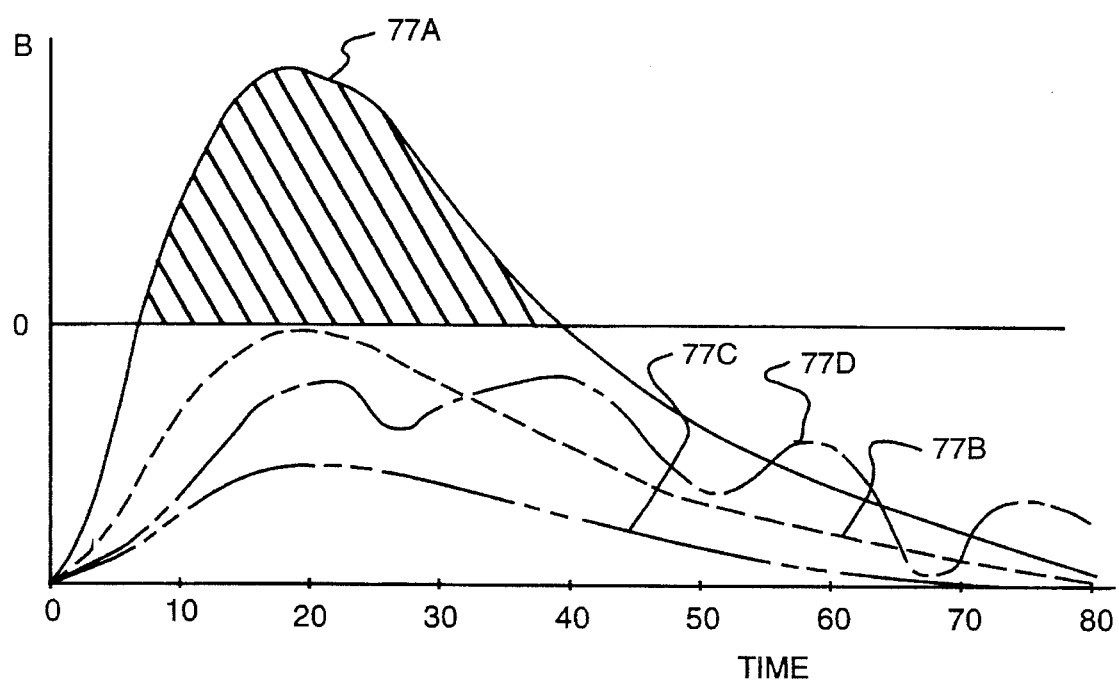
FIG. 11 shows the time response of a combined change-sensitive and burst filter to four inputs: step function, random input, and two types of cyclical inputs.

FIG. 11 shows how the B function changes with time for nodes 77 having various types of firing sequences (the period P is equal to the clock cycle T and the nodes have been non-firing prior to the time shown on the figure). Node 77A has a step change in output state 26: it changes from non-firing to firing and stays that way. Initially, the function increases at a rate based on the time constant T1 toward a maximum value. Then it falls off toward zero again at a rate based on the time constant T2. Only that cross-hatched portion of B above the threshold Bt applies in the competition for weight changes. In this example, B exceeds the threshold for thirty clock cycles.

On the other hand, the response of the other three nodes 77B, 77C, and 77D never exceed the threshold and never participate in weight increases. Nodes 77B and 77C change cyclically: 77B fires for 2 T and then doesn't fire for 2 T; 77C fires for 1 T and then doesn't fire for 3 T. Their B function never exceeds the threshold and do not compete for DAC weight increases. Node 77D changes randomly at every clock cycle T, either firing or not firing with equal probability. Its B value never exceeds the threshold and it does not compete. If all four nodes were connected to a fifth node, only node 77A would compete well enough to have its connection strength changed.

BIAS AND CLIP

Insight into how node circuits 77 self-organize is found by showing how the node circuits 77 act as multi-input Boolean functions. Using bias (the weight of threshold DAC 74) and clip (where the circuit 77 is modified to alter behavior if the voter current becomes too high or too low), circuits 77 act like common 2-input Boolean gates such as AND, NAND, OR, NOR, XOR and XNOR. A short summary of how bias and clip operate follows (see Ser. No. 07/647,645 by the present author for details).

BIAS

First consider bias. Improved self-organizing results when threshold DACs 74a . . . 74n (see Threshold Learning) are used to bias a node circuit 77. In preferred embodiments, the threshold DACs 74 are pos/neg DACs (see Positive/negative Weights) which act to change the characteristic behavior of the node circuits 77 from an "OR-like" or "NOR-like" nature to an "AND-like" or "NAND-like" nature. The terms OR-like, NOR-like, and AND-like and NAND-like used here refer to circuits 77 which have two or more inputs 25, yet behave in a similar manner to the respective 2-input Boolean gates.

Refer now to FIG. 7A where various inputs 25 of a level circuit 21 produce outputs 26 of that level. Assume for the moment that only a few of the weights associated with the inputs 25 have grown large enough during learning to dominate the node's behavior. If the bias on a threshold DAC 74 is a high negative one, it acts to prevent the circuit 77 from firing unless two or more of the inputs 25 fire; the circuit is "AND-like" because a 2-input AND gate fires only if both of its inputs fire. On the other hand, a low negative bias lets the circuit 77 fire if at least one of its inputs 25 fire; the circuit is "OR-like" because a 2-input OR gate fires if either of its inputs fire. The terms "AND-like" and "OR-like" also apply to multi-input circuits 77.

The bias can also be positive. "NAND-like" and "NOR-like" circuits 77 always fire unless acted upon by their inputs 25. The threshold DAC 74 adds current to the voter 75 which can only be drained by inputs 25 with negative weights in their associated DACs 60. A high positive bias makes the circuit 77 NAND-like since two or more large current drains (caused by inputs 25 with large negative weights) are needed to prevent the output 26 from firing. A single input 25 does not drain enough current from the voter 75 to prevent it from firing because of the high current injected by the threshold DAC 74.

In contrast, a low positive bias acts NOR-like: it is always firing unless a large current is drained from its voter 75. In NOR-like circuits 77, the small current injected by the threshold DAC 74 can be overcome by any of the inputs 25 whose current drain exceeds it. NOR-like nodes 77 need one or more inputs 25 to prevent firing.

Bias comes about in two ways. First, node circuits 77 have an inherent bias which makes an individual circuit behave in an OR-like, NOR-like, AND-like or NAND-like manner. Second, the bias can be modified during learning (i.e., in conjunction with learn signal 8) of the self-organizing system 1 (FIG. 1) to change the characteristic behavior of the circuit 77 during learning.

CLIP

Clip is another means by which the behavior of the circuits 77 can be altered to provide improved self-organizing. While bias changes the circuit 77 from OR/NOR-like to AND/NAND-like characteristics, clip changes it from OR/NOR-like to XOR/XNOR-like characteristics. The XOR and XNOR functions, like the OR, NOR, AND and NAND functions, are 2-input Boolean operators. XOR is the "exclusive OR" function; XNOR is the "exclusive NOR" function. The terms "XOR-like" and "XNOR-like" used here refer to circuits 77 which have two or more inputs 25, yet behave in a similar manner to their respective 2-input Boolean gates.

When circuits 77 are made to operate like XOR or XNOR functions, they provide the circuit 1 with a "decision" capability. Rather than "averaging" the effects of the inputs as the OR/NOR functions do, the XOR/XNOR functions force the output of the circuit 77 to be determined by one input or another, not a combination of both. XOR/XNOR functions provide a branching organization of input patterns 11 which aids in correctly determining the proper output 3.

The clip function resembles the response of actual neurons. When a neuron receives too large an input signal (that is, the neuron's internal potential is driven too high), "cathodal block" prevents the neuron from firing. Such a function is XOR-like; it behaves like a Boolean XOR. Consider a two-input XOR gate. It fires if either of the inputs fire, but doesn't fire if both or neither input fires. It's behavior is similar to the OR gate except for the case where both inputs fire: the OR fires but the XOR does not. Similarly, an XNOR gate responds like a NOR gate except for the case where both inputs fire: the NOR doesn't fires but the XNOR does. To make an OR gate into an XOR gate requires only that the output of the gate be "clipped" (not fire) for the case where both inputs fire.

Just as a node circuit 77 (FIG. 7A) is modified by the bias to produce OR/NOR-like and AND/NAND-like behavior, the same circuit 77 can be modified to produce XOR/XNOR-like behavior. While the term XOR and XNOR only apply to 2-input Boolean gates, in general, a node circuit 77 is XOR/XNOR-like if its output is altered when the input voltage to its voter 31 (FIG. 3) is either too high (XOR-like) or too low (XNOR-like). Also like bias, clip can be either fixed (assigned an initial value that doesn't change) or modified during learning (changing the value at which clipping occurs).

CHANGE PROPAGATION

When node circuits 77 are randomly assigned bias and clip values, various behavior of the nodes is produced. Low bias produces OR/NOR-like behavior; high bias produces AND/NAND-like behavior. Low clip values produce XOR/XNOR-like behavior. Depending on the mix of the bias and clip values, the change sensitivity of the self-organizing system 101 is altered.

"Change" means the circuit's input or output state changes from either firing to non-firing or from non-firing to firing. Change propagates more easily through level circuits 21A . . . 21N when the nodes 77 have a high ratio of XOR/XNOR-like circuits (compared to OR/NOR-like or AND/NAND-like circuits) because their output 26 is more likely to change state when one or more of their inputs 25 change state. By comparison, a 2-input OR, NOR, AND or NAND gate has only a 25% likelihood of changing state if one of its inputs changed states randomly, half that of a 2-input XOR or XNOR gate.

If the circuits 77 are primarily XOR/XNOR-like (low clip values), small changes in the input set 2 are likely to propagate to the outputs 3. A change in a single node circuit 77 of the lowest level 21A will likely produce change in several nodes 77 in the next level 21B, which will likely cause even more nodes 77 to change on the next higher level. The effect cascades to ever higher levels until many nodes 77 (and outputs 3) of the last level 21N are affected.

However, if there are mostly OR/NOR-like or AND/NAND-like circuits 77 (with high clip values), small changes of the input set 2 do not readily propagate toward the output signals 3. Their output 26 is less likely to change state if an input 25 changes. A node that changes on the lowest level 21A will not likely propagate to higher level nodes.

Change propagates more readily in a few other circumstances as well. For example, multi-input AND-like circuits 77 which are firing (and OR-like circuits 77 which are not firing) are sensitive to changes in their inputs 25. In these circuits 77, any change in an input 25 having a large weight will change the output 26. In addition, cooperative competition functions, where the weight increases associated with several inputs 25 are of the same sign and approximately the same value, produce nodes 77 having change sensitivity (see Share, in Ser. No. 07/647,645).

By altering the mix of change-sensitive node circuits 77 like those above, the entire behavior of the self-organizing circuit 1 is altered. If there is a high ratio of change sensitive circuits 77, even the change of a single input 2 will propagate easily in the network's preferred direction (see Directed Networks). As the ratio drops, the network becomes less sensitive to changes of a single input line 2; for changes to propagate, several input signals 2 must change.

Here then is a method by which the self-organizing circuit 1 can discriminate between small changes and large changes to the input pattern 11. If the circuit 1 is to be sensitive to small changes, then the circuits 77 are chosen to be change sensitive (e.g., have low clip values) such that small changes propagate readily to the output signals 3. If the circuit is to be made insensitive to small changes, nodes with low change sensitivity are chosen. Most information which a circuit 1 is required to learn needs both a "detail" sensitivity (the ability to detect small changes in the input set 2) and "global" sensitivity (the ability to be insensitive to small changes to the input set 2).

In general, the preferred embodiment is for circuits 77 to have a range of change sensitivity that include both high change sensitive circuits like the XOR and XNOR-like circuits as well as low change sensitive OR/NOR-like and AND/NAND-like circuits 77. Depending on the mix, the self-organizing circuit 1 becomes detail sensitive or becomes global sensitive. More important, having nodes with a range of change sensitivity gives the output signals 3 of the circuit 1 the capability of responding both to small changes of the input pattern 11 as well as to large changes.

TUNNELING AND DENSIFYING

Tunneling and densifying are a means by which a circuit 1 learns new patterns 11. Tunneling is a means by which change propagates from the inputs 2 of circuit 1 to its output signals 3. Tunneling is usually associated with distinction tasks where the pattern 11 differs from a previously learned pattern. In tunneling, competitive competition functions are typical: only one or a few of the inputs 25 of a node 77 are rewarded (see Competition).

Densifying is the logical opposite of tunneling. While tunneling is used to distinguish a changing pattern of nodes 77 from its background, densifying reinforces the changes produced by tunneling (see Association and Distinction). In densifying, cooperative competition functions reward many of the inputs 25 to a node 77 (see Cooperation). Tunneling uses the "incorrect" signal 6a or distinction signal 6b as universal signals. By contrast, densifying uses the "correct" signal 5a or the association signal 5b to direct the amount of weight increment (e.g., U=+1 in Eqn. 6).

Tunneling modifies the weights of unchanged nodes 77 which lie near a "root". The root is a region of changed nodes 77 which penetrates the unchanged nodes. Densifying modifies the connections between changed nodes 77 within the root in a way which encourages the root to persist, so long as the same input set 2 persists.

By analogy, tunneling is similar to an army's invasion into enemy territory. The attacker represents changed nodes 77 and the defender represents unchanged nodes 77. The attacker forms a "root" or thrust as it penetrates into the defender's territory. Like tunneling, the attacker directs the most effort at the point of penetration. Densifying is similar to the army's reinforcement of its conquered territory. Once the root is conquered, connections are made between units within the root to reinforce each other. The reinforcement assures that each part of the root helps its neighboring units withstand assaults by other attackers.

TUNNELING

To understand tunneling, consider a circuit 1 a composed of nodes 77 of levels 21A . . . 21N whose purpose is to respond to changes of the input set 2 composed of inputs 2a . . . 2n corresponding to the input pattern 11. For simplicity, the input set 2 has been chosen to be the input set 25a . . . 25n of the examples previously discussed: the components of the letters of the alphabet such as left slant 2a, right slant 2b, horizontal 2c and vertical 2n. In the circuit 1a, no preprocessor circuit 20 or sensors 10 are used since the component inputs 2 have already been identified; input patterns 11 are the same as the input set 2a . . . 2n.

The network of nodes 77 in this circuit 1a is directed from lower level 21A to higher level 21N: from left to right as in FIG. 2 (see Directed Networks). Each input 25 of each node 77 has the preferred embodiment of the Boolean function shown earlier (see Combined Filters). The B function lets only those inputs which change compete for DAC 60 weight increases, but the change must be neither too quick, nor too slow.

Let the nodes 77 of circuit 1 a have bias and clip values (see Bias and Clip) which produce a mix of both change-sensitive nodes (e.g., XOR/XNOR-like nodes) as well as change-insensitive nodes. Assume at least a few inputs 25 to each node 77 from the inputs 2 or from other nodes 77 have already formed large binary numbers in their DACs 60 from previous learning experiences (see Addendum). Assume also that connections between nodes are local ones: that the inputs 25 to any node are from other nearby nodes. A node 77 is much more likely to have connections from an adjacent node 77 than to have connections from a more distant neighbors.

Further, let the output nodes (the nodes 77 of the highest level 21N of circuit 1a whose outputs 26 are output signals 3) be inhibiting to other output nodes. That is, when an output node 77 fires, its firing draws current from the voters 75 of the other output nodes 77, tending to prevent them from firing. The result is that one, and only one, of the outputs 3 of level 21N tends to fire (see Negation).

In FIG. 12A, each small square represents the state (firing nodes are black and non-firing nodes are white) of an input 2 or an output 26 of a node circuit 77. The leftmost column represents the input pattern 11 (that is, the input set 2). The second through last columns represent the outputs 26 of level circuits 21 like that shown in FIG. 7A: the second column shows level 21A outputs 26 and the rightmost column shows the output set 3.

For any particular input pattern 11, the output states 26 of the nodes 77 of level circuits 21 will usually form a stable pattern. Shown in FIG. 12A is a typical stable pattern representing the null set: no inputs 2 are firing (no black squares in the lefthand column). In the pattern produced by firing and non-firing nodes 77, the non-firing nodes are just as important in producing the pattern as the firing nodes (see Non-firing Nodes). Notice that a stable pattern forms even when there are no inputs 2 present. Since some of the nodes 77 act like Boolean "NOT" functions (NOR, NAND or XNOR functions), even when their inputs 25 fire, the node 77 may not fire because the threshold current prevents it from firing.

The null pattern shown in FIG. 12A is the "background pattern" against which change is measured. The null pattern was one chosen for convenience only. Indeed, the background pattern can be any pattern from which a difference is detected. It is not the pattern itself which is important, but rather, the changes from this pattern, as measured by the Boolean function B, which direct learning behavior of the self-organizing circuit 1a.

Now consider the case where a "new" pattern 11 is learned. The new pattern 11 represents the letter "A". As before, the "A" has inputs 2a, 2b, and 2c from its three major components, slant left "/" slant right " \ " and horizontal "–". Recall that the nodes 77 in the circuit 1a are a mix of both change-sensitive nodes and change-insensitive nodes. When inputs 2a, 2b and 2c change, some of the surrounding nodes 77 are likely to be change-sensitive and change when the inputs change. For instance, a node 77d in level 21A (the second column) might, by happenstance, be an AND-like node 77 which required the input 25 from node 2c to fire. Without the input 2c, node 77d doesn't fire but with input 2c, it does fire: it changes state from non-firing to firing. Other nearby nodes in the levels 21A and 21B also change state when the input set 2 for "A" is presented. Some of these changes in turn produce a change in levels 21C and 21D as the change propagated to higher levels (rightward in FIG. 12A).

However the changes at 2a, 2b and 2c do not likely propagate all the way to the output level 21N (output column 3, the rightmost column). While many of the nodes 77 are change-sensitive, many are not. The nodes which are not change-sensitive tend to prevent change from cascading to higher levels 21. With a mix of both types of nodes, a few input changes (like 2a, 2b, and 2c) do not usually propagate far into the circuit 1a.

After many time steps T, the network of nodes 77 might look like that in FIG. 12B. Shown here is not the state of the nodes 77 (i.e., whether they fired or not), but rather how they changed from the background state of FIG. 12A. A small black square represents a node 77 which changed from firing to non-firing or from non-firing to firing; a small white square represents a node 77 which did not change state. Note that the inputs 2a, 2b and 2c (in the leftmost column) are all black squares: they change from not-firing to firing.

The path of black squares from left to right is called the root. It represents how far the change in the input pattern 11 has progressed toward changing an output 3 (the rightmost column). Without tunneling, the root will not likely progress very far since change-insensitive nodes 77 tend to absorb any changes to their inputs 25. Tunneling uses the Boolean function B to destabilize nodes 77 on the root shown in FIG. 12B (see Stabilizing and Destabilizing). Those unchanged nodes 77 (white squares in FIG. 12B) which have inputs from the changed nodes 77 (black squares) will have high B values: their inputs 25 (the IF(Y) term in Eqn. 10) will have changed state. Since the network of circuit 1a is directed rightward, nodes such as nodes 77k will be destabilized.

As nodes 77k are destabilized, their Fill (the net current going to their voters 75) is altered in a way to make their Fill change sign (see Firing Balance). The appropriate weights are incremented as in Eqn. 6 (where U=−1 for destabilizing), driving the nodes 77k to change state. If their Fill is positive (firing nodes) weights or thresholds are incremented negatively to drive them toward changing state (toward not firing). If their Fill is negative (non-firing nodes), weights or thresholds are incremented positively to drive them toward changing to the firing state. Once one or more nodes 77k surrounding the root end changes state, then other nodes 77 to the right of these now-changed nodes 77k will also likely change. The rightward path of black squares proceeds, triggering more rightward nodes 77 to change. The root progresses for a level or two rightward and then the tunneling process begins anew on other nearby nodes 77 in an effort to destabilize them and add them to the root. A nearby node 77 sometimes changes due to its inputs 25 changing and sometimes due to new weights destabilizing them.

Often many presentations of the new input pattern 11 (e.g., the inputs for "A") are required to complete a root path from an input 2 change to an output 3 change. The most efficient learning occurs when the new pattern 11 and the background pattern 11 are presented alternately. When the background pattern 11 is presented, the nodes 77 which formed the root revert back to their original states (as shown in FIG. 12A).

After the change occurs, the B values are recomputed. Once again they are high for the nodes which had been on the root: the same root path as before, but now the change is from the new pattern 11 to the background one. Again, increments of weights are added in a way that destabilizes unchanged nodes 77 near the root tip. If destabilized enough, the unchanged nodes 77 change state and the root path grows rightward again. When the background pattern 11 is presented as inputs 2, occasionally some of the nodes 77 do not revert to the original background pattern. If so, this newest background pattern becomes the background pattern. The background pattern, then, is simply whatever pattern of outputs 26 of nodes 77 result when the original pattern 11 is presented.

By switching back and forth between the original pattern 11 and the new pattern 11, the appropriate nodes are destabilized and change state until eventually the root progresses far enough rightward that the output 3 state changes (as shown in FIG. 13B). Soon the Boolean function B has sensitized the circuit 1a to just those differences that represent the components of the letter "A". By using tunneling, the changed inputs 2 destabilize surrounding nodes that eventually cut a path to the output column 3. Indeed, our own brains operate in the same way. When we wish to distinguish a pattern, we take the closest similar pattern and focus our attention on just those components that distinguish the two. Then we shift back and forth between the two patterns until we learn how to separate the two.

When two input patterns 11 which differ only slightly are to be distinguished, one of the resulting patterns of nodes 77 is used as the background pattern rather than using the null background pattern. For instance, to distinguish a letter "A" from the letter "V" let the background pattern be that produced when the letter "A" input set is presented. After many time steps, the B function will drop to zero and the background pattern becomes the one shown in FIG. 13A: the "A" node pattern. Then when the "V" input pattern is presented, the only change between the "A" pattern and the "V" pattern is the horizontal, input 2c. It is only the input 2c which produces a root that eventually tunnels across to the output column—a root which represents the difference between the "A" node 77 pattern and the "V" node 77 pattern.

Note that tunneling works as well for time-varying patterns 11 as for static patterns 11. In time-varying patterns 11, both the outputs 26 of nodes 77 (as in FIG. 12A and 13A) and the changes of these outputs (as in FIG. 12B and 13B) are time-varying. However, only slowly changing patterns 11 cause tunneling (changes which have a bandwidth less than 1/T1). For a time constant T1 on the order of 5 T to 10 T, only changes having a duration of 20 time steps (20 T) compete effectively enough to produce tunneling weight changes. Similarly, people require at least 20 pulses of a neuron (20 msec of 1 millisec pulses) to learn. Optic or auditory inputs (sights or sounds) which change faster than about 20 msec are difficult to perceive. For example, movie frames need change only once every 30 msec because we can't perceive motion at faster rates.

DENSIFYING

One application of densifying is to stabilize roots formed during distinction tasks. In tunneling, often the changed nodes 77 comprising the root have Fill values which are only barely able to maintain a changed state of the node. Densifying uses a cooperative competition function to strengthen connections: the changed nodes 77 stabilize other changed nodes 77.

For example, when the input pattern 11 for "A" is presented to the circuit 1a, the changed nodes 77 are the root of FIG. 13B. Now when the output 3e fires, that correctly identifies the "A" input pattern 11 and actuates the universal reward signal 5a. Consider node 77n, one of the nodes in the root. As viewed by node 77n, nearby nodes in the root like 77m and 3e have high B values: they have recently changed state. According to Eqn. 6, the weights from nodes 77m and 3e will both increase toward +WMAX (X is positive and U is positive). When nodes 77m and 3e fire, they will add positive current to node 77n, tending to assure it will fire as well. As noted earlier (see Directed Networks), stabilizing has little regard to net direction: node 3e is just as likely to reinforce node 77n as node 77m (despite the network being directed left to right).

Densifying uses nodes in the root to reinforce each other's firing or non-firing. In circuit 1a above, the firing of node 77n is not only strengthened by nodes 77m and 3e, but its firing can strengthen their firing. From the perspective of nodes 77m and 3e, node 77n represents a changed input 25: its B value is likely high and it would likely produce weight increases in the links from 77n to 77m and 3e. The effect is that more current is injected from node 77n when it changes, reinforces the firings of node 77m and 3e.

Non-firing nodes which have changed (such as node 77o) are also reinforced by firing nodes during densifying. In FIG. 13A and 13B, node 77m is identified as a firing node which has changed. As an input 25 to node 77o, Eqn. 6 specifies that the current contributed by node 77m should grow more negative (U is positive and X is negative for 77o, so the weight grows toward −WMAX). Again, the effect is stabilizing: driving the Fill of a non-firing node 77 more negative makes it even less likely to fire (see Stabilizing and Destabilizing).

The effect of densifying a root such as the one in FIG. 13B is to make its changed nodes 77 act in concert. If several root nodes 77 have a state consistent with their root state (their state when they were densified), they tend to make the rest of the nodes in the root change to their root state as well. For example, in circuit 1a, if nodes 77m and 77n should change (say, due to an input 25 from a non-root node), then other root nodes (nodes 77o and 3e) tend to change too. Densifying assures that the nodes 77 which changed during tunneling are reinforced and can produce the same change in the future.

Figures 14A, 14B:
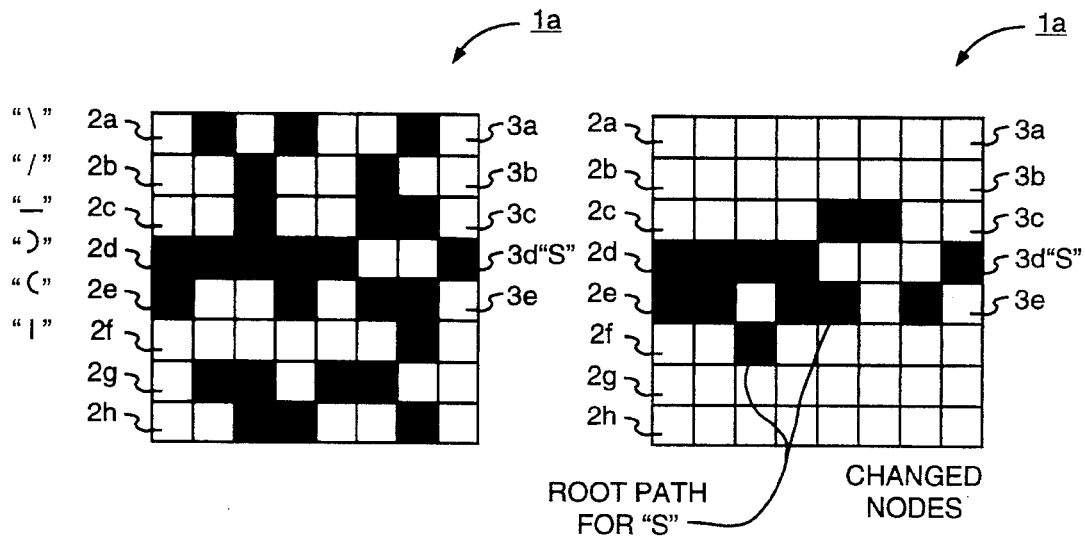

Densifying can also associate two input patterns with each other. Consider a typical association task of the same circuit 1a: associating the letter "A" with the letter "S" to represent the word "AS". FIG. 14A shows the circuit 1a response to the components 2d and 2e, the curve left and curve right which are the components to the "S". FIG. 14B shows the change in the nodes 77 from the null background pattern. Tunneling has cut a root from inputs 2d and 2e across to the output 3d causing it to fire. The "S" root is densified so that when the "S" input pattern 11 is presented, the output 3d results.

To associate "A" and "S", the input pattern 11 includes the components for both the "A" components (2a, 2b and 2c) as well as the "S" components (2d and 2e). Some of the nodes 77 which change for the combined pattern 11 are the same as those which changed with the individual patterns for "A" and "S", especially those in the first few levels 21. In higher levels 21, where the "A" and "S" roots intersect, a new root of nodes 77 forms that's different from either the "A" root or the "S" root.

Figures 15A, 15B:
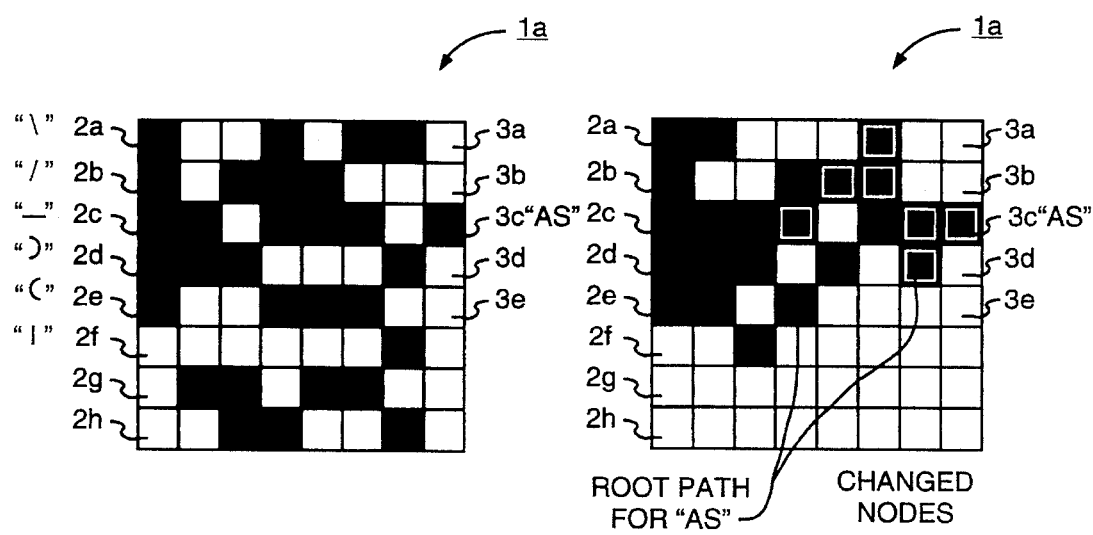

The new root represents "AS", the association of "A" and "S". Like the "A" and the "S" roots, the "AS" root can tunnel to higher levels and be densified. FIG. 15A shows the firing pattern of the nodes 77 while FIG. 15B shows how these nodes have changed from the null pattern. Also shown in FIG. 15B are the nodes which changed which did not change when either the "A" or the "S" root fired. These nodes—the "AS" root—are shown by a bold outline on the nodes. The "AS" root (after many repetitions of tunneling and densifying) causes output node 3c to fire; when 3c fires, it identifies the input pattern 11 as being the "AS" pattern. Note that the association might as easily have been a sequential one. If the "A" input pattern 11 is first presented, followed quickly (several T1 time constants) by the "S" pattern, the two patterns will associate as a sequential pattern, rather than a simultaneous one.

DUAL DIRECTED NETWORKS

Often two directed networks, each directed in the opposite direction, can improve the self-organization ability of a circuit 1 (see Directed Networks). In dual directed networks, some of the nodes 77 collect information from lower levels 21 and produce changes at a higher level 21 (directed rightward in FIG. 2) while other nodes 77 collect information from higher levels 21 and produce change at lower levels 21 (directed leftward in FIG. 2). Such an arrangement allows tunneling to proceed rightward from changed inputs 2 and also leftward from changed outputs 3.

The cortex of mammals seems to be set up with dual directed networks. Neurons in the cortex have some axons which are directed radially inward (in toward the center of the brain). These neurons are intermingled with (and connect to) other neurons whose axons are directed radially outward.

In general, the nodes of the right-directed network are intermingled with those of the left-directed network where each node 77 is randomly determined to be either right-directed (with its inputs 25 coming primarily from its left) or left-directed (with inputs 25 coming from its right). However for illustration in FIG. 16A, the left and right directed networks are chosen to be uniformly meshed like the squares in a checkerboard: right-directed nodes 77 (red squares) alternate with left-directed nodes 77 (black squares). Understand that nodes 77 of each net connect with nodes of the opposite directed network as well as those of its own directed network. In the checkerboard analogy, a red square might belong to a right-directed network; it is connected to other squares to its left whether they are red or black.

Consider again the case where the input pattern 11 represents the letter "A" and the output 3e is chosen, a priori, to be the output 3 which detects the letter "A". As before, the input changes 2a, 2b and 2c tunnel through the right-directed nodes 77 from lower level 21A toward higher level 21N (from left to right in FIG. 16A). As before, a root of changed nodes 77 forms from the changed inputs 2 and proceeds toward the output column 3. But, in addition, another root begins at the output 3e and tunnels through the left-directed nodes 77 toward lower levels 21 (from right to left in FIG. 16A). Rather than a root tunneling from one edge of the circuit 1 to the other, two roots tunnel from the edges toward the middle.

Figures 16A, 16B:
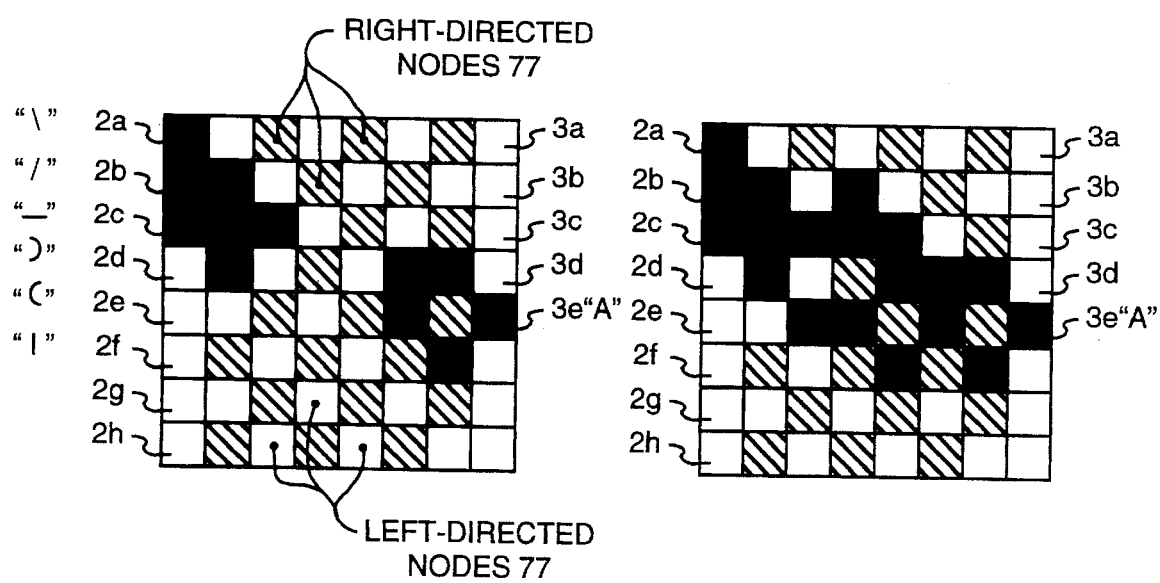
FIG. 16A and 16B show the changes in the output states of a modified circuit 1 as both the input and output change as learning proceeds.

FIG. 16A shows the circuit 1a learning to respond to the letter "A" with an output 3e early in the learning process. Shaded nodes 77 are right-directed and the alternate unshaded nodes 77 are left-directed. Changed nodes 77 emanate rightward from nodes 2a, 2b, and 2c as well as leftward from node 3e. FIG. 16B shows the changed nodes 77 of circuit 1a at a later time when the roots have progressed far enough to interact with each other, essentially forming one large root.

Through densifying, the changed nodes 77 reinforce each other. This is true regardless of which root—rightward or leftward—to which the nodes initially belonged. In densifying, a changed node 77 belonging to a left-directed network stabilizes another node 77 belonging to the right-directed network despite being opposite to its net direction. After learning the input pattern for "A", changing the input pattern to "A" (inputs 2a, 2b and 2c) successively triggers each node in the root until the output 3e changes.

Applications for dual directed networks include circuits 1 which stimulate the muscles of paraplegics. The inputs 2 are from orientation (i.e., artificial balance sensors) and limb position sensors. The muscles which are to contract are connected to the output set 3. However, unlike the examples above, several of the outputs 3 may change simultaneously. Thus a pattern 11 of sensor inputs 2 is convened into a pattern of muscle firings that allow the paraplegic to perform complex motor skills artificially.

While dual directed networks are most efficient in self-organizing, they are not required. A random directed net is one where each node circuit 77 is randomly aligned. Such nets can tunnel and densify like directed nets and make associations and distinctions of their input pattern 11. Indeed, lower forms of life do not appear to have either directed nets or dual directed nets.

OTHER EMBODIMENTS

Other embodiments are detailed in prior patents and continuations by the present inventor: U.S. Pat. Nos. 4,479, 241, 4,774,677 and 4,989,256. These patents include variations of the self-organizing system and are mentioned here because the present invention also applies to the these variations. In these patents, the preprocessor circuit 20 are explained in more detail. Specific embodiments of circuits 20 can preprocess information into a form acceptable to the self-organizing circuits in levels 21. The two types of information fall generally into the classes of static and time-varying information. An example of the former is visual information patterns representing printing or handwriting; an example of the latter is audio information such as recognizing patterns of speech or music.

Another embodiment of the prior inventions is to provide primarily analog methods of accomplishing self-organizing, to provide primarily digital methods of self-organizing and also to provide variations which include some analog circuitry combined with some digital circuitry to accomplish self-organizing. Digital methods can be implemented in special purpose digital circuitry designed for the task, in general purpose digital circuitry designed to handle filtering tasks (DSP circuits) or even in a general purpose digital computer where the action of analog circuits are simulated by software techniques. Other means for weighting (how much one circuit 77 can influence its own firing or that of another circuit 77) are discussed which don't use DACs 60.

In the present invention substantially parallel circuitry is used for circuits 77 which accepts multiple inputs 25 from other similar circuits 77, which acts on these inputs, and outputs signals 26 to yet other similar circuits 77. In the prior patents, provision is made to connect circuits 77 in a combination of parallel and serial manner: parallel manner meaning two or more of the similar circuits 77 acting simultaneously; serial manner meaning that one or more of the circuits 77 act only after another has acted.

For example, the summing function of the voter 75 of a circuit 77 can be implemented by hardware as in the present invention such that each circuit 77 calculates the sum of inputs 25 from other circuits in parallel. But the summing calculation could also be done by digital circuitry that summed inputs 25 sequentially as a microprocessor does. If a microprocessor was assigned to each node 77, the array of microprocessors would operate in parallel even though each one acts internally in a serial manner. On the other hand, the entire task of self-organizing has been simulated on a single microprocessor which is a substantially serial means of providing self-organizing.

In addition, the prior patents provide both electrical and non-electrical means by which circuit 1 can self-organize. Non-electrical means include pneumatic, chemical, optical or other means which obey the rules set forth for self-organizing as described here. The prior patents also provide methods by which information between circuits 77 of the self-organizing circuit 1 can be transmitted by time-variations of signals. These time variations encompass the range between simple changes between two or more signal levels (e.g., binary data), to pulses whose width or rate (or coded sequence of widths or rates) carries the information, the purpose being to reduce the number of inter-connections between circuits 77 of the system.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A self-organizing system having a system input signal with constituent elements comprising:

self-organizing means for providing an output signal corresponding to the analysis of the constituent elements of said input signal, said self-organizing means further comprising a plurality of subcircuits, each subcircuit having a changeable state and at least one subcircuit adapted to receive messages of the subcircuit state from at least one other subcircuit, said subcircuits organized into a plurality of levels;

an input set composed of both the constituent elements of said system input signal and the output state of each said subcircuit, each subcircuit adapted to receive input messages from at least one element of the input set and which input messages can originate from other subcircuits in previous levels, in the same level and in higher levels, wherein said input messages provide relative amounts of positive and negative weighting on said subcircuits;

voting means for voting on the state of each said subcircuit based on a comparison of the relative amounts of positive and negative weighting which the input messages have on each subcircuit;

weighting modification means for modifying the weighting of the inputs to each said subcircuit based upon the changes of state of the received input messages.

2. The system of claim 1 wherein said weighting means further comprises universal means for additionally modifying the weighting of the inputs of said subcircuits using universal signals directing said system as a whole between associating said system input with previously learned system inputs and distinguishing said system input from previously learned system inputs.

3. The system of claim 2 wherein said weighting means further comprises comparison means for comparing the relative amount of positive and negative input to said voting means, wherein the comparison in conjunction with said universal means determines whether weight modification of the subcircuit will change from its present value.

4. The system of claim 3 wherein said weighting means has a growth capability which can be limited by the comparison of the relative amounts of positive and negative input provided by said comparison means.

5. The system of claim 1 further comprising time-filtering means for time-filtering said changes of state to exclude from modification subcircuit inputs which change faster than a first determined value and slower than a second determined value.

6. The system of claim 1 in which the changes of subcircuit state include changing from a firing state to a non-firing state and changing from a non-firing state to firing state.

7. The system of claim 1 in which said weighting means is based upon competition among time-filtered Boolean functions computed between the received messages of a subcircuit and the state of that subcircuit and which accumulate over a period of time.

8. The system of claim 2 further comprising destabilizing means, associated with a subcircuit which has changed state, for modifying the weighting of positive and negative inputs to the voting means of a different subcircuit to make that said subcircuit more likely to change state.

9. The system of claim 2 further comprising stabilizing means, associated with a subcircuit which has changed state, for modifying the weighting of positive and negative inputs to the voting means of a different subcircuit to make that said subcircuit less likely to change state.

10. The system of claim 8 wherein said universal means directs all subcircuits which have changed state to use said destabilizing means to propagate changed states to other subcircuits.

11. The system of claim 9 wherein said universal means directs all subcircuits which have changed state to use stabilizing means to ensure that these same subcircuits which have changed state will change in the same way in the future.

12. The system of claim 1 in which the changes of subcircuit state includes only changing from a non-firing state to a firing state.

13. The system of claim 1 in which said changes of state of the received input messages cycle from one state to another state and back again at different cycling rates.

* * * * *